(12) United States Patent
Nguyen et al.

(10) Patent No.: US 12,162,591 B1
(45) Date of Patent: Dec. 10, 2024

(54) ANTI-PHASE NOISE SUPPRESSION ROTOR TECHNOLOGIES

(71) Applicant: United States of America as Represented by the Administrator of NASA, Washington, DC (US)

(72) Inventors: Nhan Thanh Nguyen, Santa Clara, CA (US); Nicholas Bryan Cramer, San Jose, CA (US); Juntao Xiong, Irvine, CA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 596 days.

(21) Appl. No.: 17/127,855

(22) Filed: Dec. 18, 2020

Related U.S. Application Data

(60) Provisional application No. 62/950,935, filed on Dec. 20, 2019.

(51) Int. Cl.
*B64C 27/00* (2006.01)
*B64C 27/46* (2006.01)
*B64C 27/467* (2006.01)

(52) U.S. Cl.
CPC .......... *B64C 27/001* (2013.01); *B64C 27/463* (2013.01); *B64C 27/467* (2013.01); *B64C 2027/003* (2013.01)

(58) Field of Classification Search
CPC ..... B64C 27/001; B64C 27/46; B64C 27/463; B64C 27/467; B64C 2027/003; F01D 5/12; F01D 5/14; F01D 5/141; F01D 5/16; F05D 2260/96
See application file for complete search history.

(56) References Cited

U.S. PATENT DOCUMENTS

| | | | | |
|---|---|---|---|---|
| 2,238,749 | A | * 4/1941 | Peltier | F04D 29/384 416/212 R |
| 4,334,828 | A | 6/1982 | Moffitt | |
| 4,830,315 | A | * 5/1989 | Presz, Jr. | F01D 5/141 244/130 |

(Continued)

OTHER PUBLICATIONS

"Design specifications Volocopter 2X", e-volo GmbH, [Online] Retrieved from the Internet: <URL: https://www.volocopter.com/assets/pdf/2017_04_Design_specifications_2X.pdf>, (2017), 2 pgs.

(Continued)

*Primary Examiner* — Elton K Wong
(74) *Attorney, Agent, or Firm* — Rhys W. Cheung; Robert M. Padilla; Trenton J. Roche

(57) ABSTRACT

An anti-phase rotor system for an aircraft may include at least one rotor with at least two rotor blades. The aerodynamic profile of these two blades may be selected to create counteracting blade vortices to break up harmonic reinforcement due to the rotor blade passage. The aerodynamic profile may create a non-planar motion of one or more rotor blade passages, whereby the individual rotor blades are not co-planar during the rotation of said rotor. The rotor system may include a duct, which may include stationary vanes or struts configured in a manner so as to break up harmonic excitation to the rotor. The interior area of the duct at the area of the blade rotation may be designed in a manner so as to create a destructive rotor blade tip vortex interference.

20 Claims, 29 Drawing Sheets

(56) References Cited

U.S. PATENT DOCUMENTS

| | | | | |
|---|---|---|---|---|
| 5,588,800 | A * | 12/1996 | Charles | B64C 27/001 416/24 |
| 6,168,379 | B1 * | 1/2001 | Bauer | B64C 27/615 244/90 R |
| 6,733,240 | B2 | 5/2004 | Gliebe | |
| 9,592,910 | B1 * | 3/2017 | Beckman | B64C 39/024 |
| 2007/0131820 | A1 * | 6/2007 | Chaudhry | B64C 27/001 244/17.25 |
| 2008/0003103 | A1 * | 1/2008 | Greenblatt | B64C 27/463 416/31 |
| 2011/0058955 | A1 * | 3/2011 | Jung | B64C 27/001 416/241 R |
| 2012/0061522 | A1 | 3/2012 | Sullivan et al. | |
| 2015/0217851 | A1 * | 8/2015 | Kelso | B64C 3/14 244/200 |
| 2020/0173458 | A1 * | 6/2020 | Uffelman | F04D 29/681 |

OTHER PUBLICATIONS

Antcliff, Kevin R, et al., "Silicon Valley as an Early Adopter for On-Demand Civil VTOL Operations", 16th AIAA Aviation Technology, Integration, and Operations Conference, p. 3466, (2016), 17 pgs.

Brentner, K., et al., "Predicted Noise for a Main Rotor with Modulated Blade Spacing", Journal of American Helicopter Society, (2005).

Bres, G. A., et al., "Maneuvering Rotorcraft Noise Prediction", Journal of Sound and Vibration, vol. 39, No. 3-5, (Aug. 2003), 719-738.

Brocklehurst, A., et al., "A review of helicopter rotor blade tip shapes", Progress in Aerospace Sciences, 56, (2013), 35-74.

Chen, P. C., et al., "Blade-Vortex Interaction Noise Reduction with Active Twist Smart Rotor Technology", Smart Materials and Structures, vol. 10, No. 1, p. 77, (2001).

Cramer, Nicholas B, et al., "Investigation of Anti-Phase Asymmetric Quiet Rotor Technology", AIAA Aeroacoustics Conference, AIAA-2019-1070, (Jan. 2019), 19 pgs.

Duffy, Michael J, et al., "A Study in Reducing the Cost of Vertical Flight with Electric Propulsion", 17th AIAA Aviation Technology, Integration, and Operations Conference, p. 3442, (2017), 24 pgs.

Geiger, Derek H, et al., "Comparative Analysis of Serrated Trailing Edge Designs on Idealized Aircraft Engine Fan Blades for Noise Reduction", M.S. Thesis, Virginia Polytechnic Institute and State University, (2004), 302 pgs.

Hardin, J. C., et al., "Concepts for Reduction of Blade/Vortex Interaction Noise", Journal of Aircraft, vol. 24, No. 2, (1987), 120-125.

Jaron, Robert, et al., "Optimization of Trailing-Edge Serrations to Reduce Open-Rotor Tonal Interaction Noise", Journal of Fluids Engineering, vol. 140, No. 2, (2017).

Kurtz, Donald W, et al., "A Review of Aerodynamic Noise From Propellers, Rotors, and Lift Fans", NASA Technical Report 32-1462, (Jan. 1, 1970), 58 pgs.

Menter, F R, "Two-equation eddy-viscosity turbulence models for engineering applications", AIAA Journal, vol. 32, No. 8, (1994), 1598-1605.

Moore, Mark D, et al., "Personal Air Vehicles: A Rural/Regional and Intra-Urban On-Demand Transportation System", Journal of the American Institute of Aeronautics and Astronautics (AIAA)I, 2646, (2003), 20 pgs.

Oerlemans, Stefan, et al., "Low-noise wind turbine design", Siemens AG, (2012), 23 pgs.

Splettstoesser, W., et al., "Key Results from a Higher Harmonic Control Aeroacoustic Rotor Test (HART)", Journal of the American Helicopter Society, vol. 42, No. 1, (1997), 58-78.

Tauszig, L., et al., "Influence of Blade-To-Blade Dissimilarity on Alleviation of Helicopter Blade-Vortex Interactions", Mathematical and Computer Modelling, 33, (2001), 1139-1154.

Wang, Zhenyu, et al., "Leading-edge serrations for performance improvement on a vertical-axis wind turbine at low tip-speed-ratios", Applied Energy, 208, (2017), 1184-1197.

Williams, J. E. Ffowcs, et al., "Sound Generation by Turbulence and Surfaces in Arbitrary Motion", Philosophical Transactions of the Royal Society of London, Series A, Mathematical and Physical Sciences, 264(1151), pp. 321-342, (May 8, 1969), 23 p.

Wright, S, "The Acoustic Spectrum of Axial Flow Machines", Journal of Sound and Vibration, vol. 45, No. 2, (1976), 165-223.

Yang, Seung Joon, et al., "Aerodynamics and Aeroacoustics of Spanwise Wavy Trailing Edge Flatback Airfoils: Design Improvement", NAWEA 2015 Symposium, (2015), 31 pgs.

Yung, H. Y., "Rotor Blade-Vortex Interaction Noise", Progress in Aerospace Sciences, vol. 36, No. 2, (2000), 97-115.

* cited by examiner

US 12,162,591 B1

ANTI-PHASE NOISE SUPPRESSION ROTOR TECHNOLOGIES

RELATED APPLICATION AND PRIORITY CLAIM

This application is related and claims priority to U.S. Provisional Application No. 62/950,935, filed on Dec. 20, 2019 and entitled "Quiet Urban Aircraft Rotor Technologies," the entirety of which is incorporated herein by reference.

ORIGIN OF THE PRESENT SUBJECT MATTER

The present subject matter described herein was made in the performance of work under a NASA contract and by (an) employee(s) of the United States Government and is subject to the provisions 51 U.S.C. § 20135(b), Public Law 111-314, § 3 (124 Stat. 3330, 51 U.S.C. Chapter 201), and may be manufactured and used by or for the Government for governmental purposes without the payment of any royalties thereon or therefore.

FIELD OF THE PRESENT SUBJECT MATTER

The present embodiments relate to rotorcraft, more particularly, to passive rotor noise reduction technologies.

BACKGROUND

Rotor noise and vibration are two sources of operational challenges for all aircraft operating with open rotors such as helicopters, unmanned aerial vehicles (UAVs), urban air mobility personal air vehicles, drones, and aircraft operating with ducted fans such as passenger aircraft. One disadvantage of convention rotor design is the noise due to noise-induced shed vortices generated by rotor blades. The unique problem with rotor noise and vibration is the periodic blade passage that causes a harmonic reinforcement of unsteady forcing functions resulting from blade vortex shedding. This causes the rotor blades to vibrate and generate noise sources. It would be desired to provide an improved rotor design that reduces rotor noise.

SUMMARY

The present subject matter discloses systems and methods for reducing rotor blade vibration and acoustic signatures using anti-phase blade vortex interaction design concepts. This subject matter includes a rotor design that creates counteracting blade vortices to break up harmonic reinforcement due to the rotor blade passage. The subject matter also includes a rotor design that incorporates an anti-phase trailing-edge or leading-edge shape so as to create non-planar shed vortices and break up harmonic reinforcement of said shed vortices during the rotation of said rotor. The subject matter further includes a rotor design that incorporates anti-phase blade tips that create non-planar tip vortices and break up harmonic reinforcement of said tip vortices during the rotation of said rotor. The subject matter additionally includes a ducted rotor design whereby stationary vanes or struts are configured in a manner to break up harmonic excitation to the rotor. The subject matter moreover includes a ducted rotor design whereby the interior area of the duct at the area of the blade rotation is so designed in a manner to create a destructive rotor blade tip vortex interference. The present subject matter discloses systems and methods of integrating these rotor design concepts into an aircraft for vehicle flight control to reduce noise footprint.

DETAILED DESCRIPTION

Figure 1:
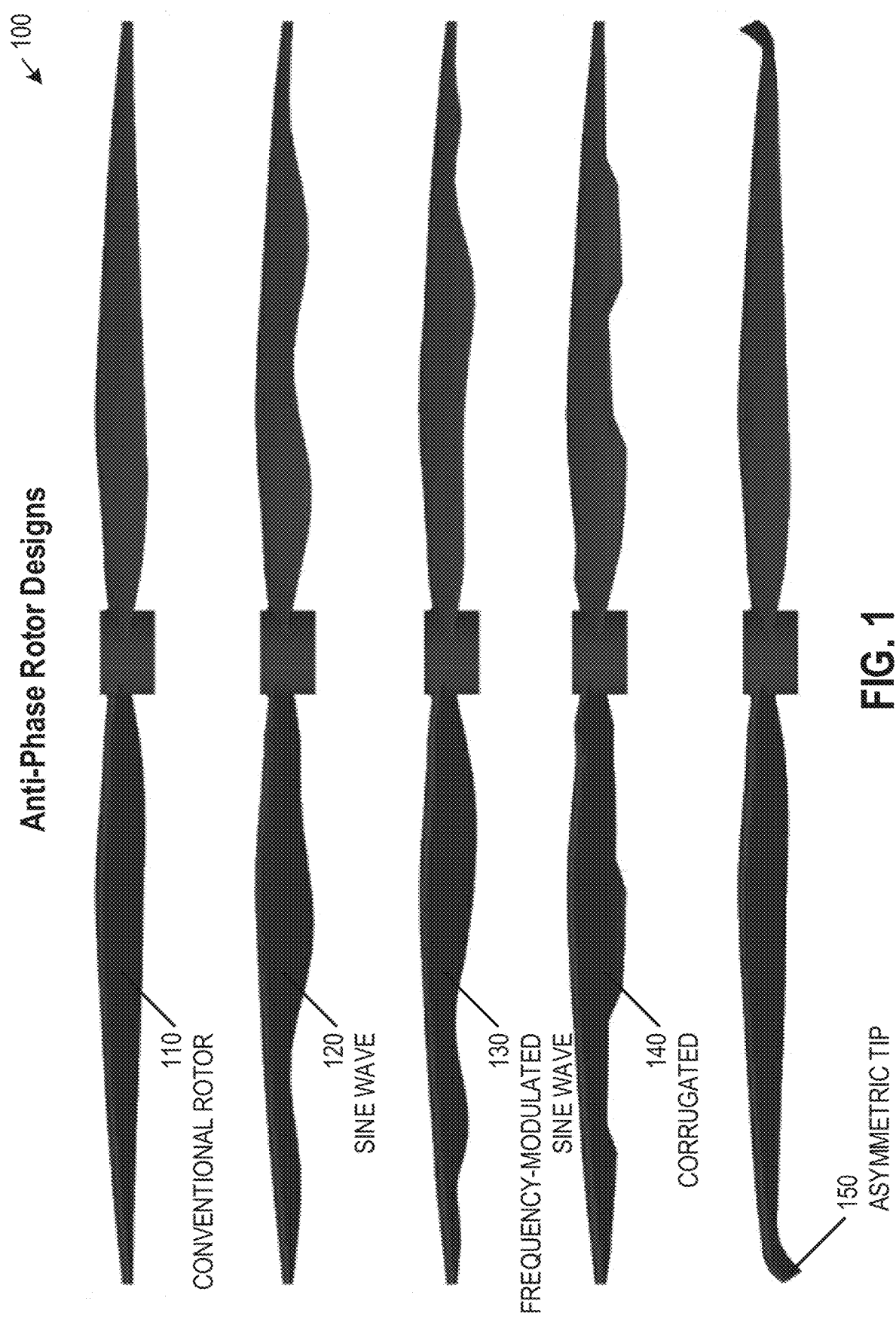
FIG. 1 is a diagram of anti-phase rotor designs 100, according to an example embodiment.

The present subject matter provides systems and methods in a rotor design for disrupting harmonic reinforcement of vortex structures during the blade passage. This may include passive or active devices that operate to create an anti-phase pattern at the trailing edge or leading edge to modify the spanwise blade loading in an irregular manner. This subject matter may include an anti-phase trailing edge and leading edge design to cause the shed vortices to be non-planar so as to break up harmonic reinforcement, asymmetric or symmetric curved blade tips with inverted airfoil design, or dissimilar rotor blade design with unequal blade length, blade chord, and blade flap incorporating the anti-phase pattern. This subject matter may further include dissimilar stator design in a ducted rotor design with non-radial, unequally spaced arrangement, or rotor blade tip path duct having slots or grooves to disrupt rotor tip vortices from reinforcement.

Some embodiments of the present subject matter include rotors with continuous trailing edge shapes in anti-phase alternating patterns to prevent harmonic vortex reinforcement along blade path and span by phase cancellation and non-planar placement of shed vortices. The rotors may include an irregular rotor design to break up harmonic vortex reinforcement. Various embodiments of the present subject matter include a passive design that has built-in shapes for fixed-geometry rotors, and an active design with actuated flaps and continuous trailing edge to prevent flap edge noise. In contrast with conventional repeating geometry rotor design, the irregular non-repeating designs described herein can break up harmonic forcing functions created by blade vortex shedding to decrease blade dynamic responses and noise.

In the following description, reference is made to the accompanying drawings that form a part hereof, and in which are shown by way of illustration specific embodiments which are practiced. These embodiments are described in sufficient detail to enable those skilled in the art to practice the present subject matter, and it is to be understood that other embodiments may be utilized and that structural, logical and electrical changes can be made without departing from the scope of the present subject matter. The following description of example embodiments is, therefore, not to be taken in a limited sense, and the scope of the present subject matter is defined by the appended claims.

The functions or algorithms described herein is implemented in software in one embodiment. The software may consist of computer executable instructions stored on computer readable media or computer readable storage device such as one or more non-transitory memories or other type of hardware-based storage devices, either local or networked. Further, such functions correspond to modules, which is software, hardware, firmware, or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component is a process running on a processor, an object, an executable, a program, a function, a subroutine, a computer, or a combination of software and hardware. The term, "processor," may refer to a hardware component, such as a processing unit of a computer system.

Furthermore, certain embodiments are implemented as a method, apparatus, or article of manufacture using standard programming and engineering techniques to produce software, firmware, hardware, or any combination thereof to control a computing device to implement the disclosed subject matter. In certain embodiments, the term "article of manufacture," as used herein, is intended to encompass a physical device that implements the claimed subject matter by means of manufacturing, and in certain embodiments, a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

FIG. 1 is a diagram of anti-phase rotor designs 100, according to an example embodiment. These designs 100 may include improvements relative to a baseline conventional rotor design 110. Improvements over the conventional rotor design 110 may include a combined anti-phase trailing edge and leading edge design to break up harmonic reinforcement, such as shown in sine wave design 120, frequency-modulated sine wave design 130, and corrugated design 140. In these anti-phase flap designs 120-140, trailing edge flaps deflect in an alternate manner from blade to blade so that the blade vortices shed by the preceding blade with a positive flap deflection are effectively cancelled by the vortices shed by the following blade by having a negative flap deflection at approximately the same radius. These asymmetric trailing edge designs are described further below with respect to FIGS. 2-5. The anti-phase rotor designs 100 also include asymmetric or symmetric curved blade tips with an inverted airfoil, such as shown in the asymmetric tip design 150. These asymmetric blade tip designs are described further below with respect to FIGS. 11-12.

Figure 2:
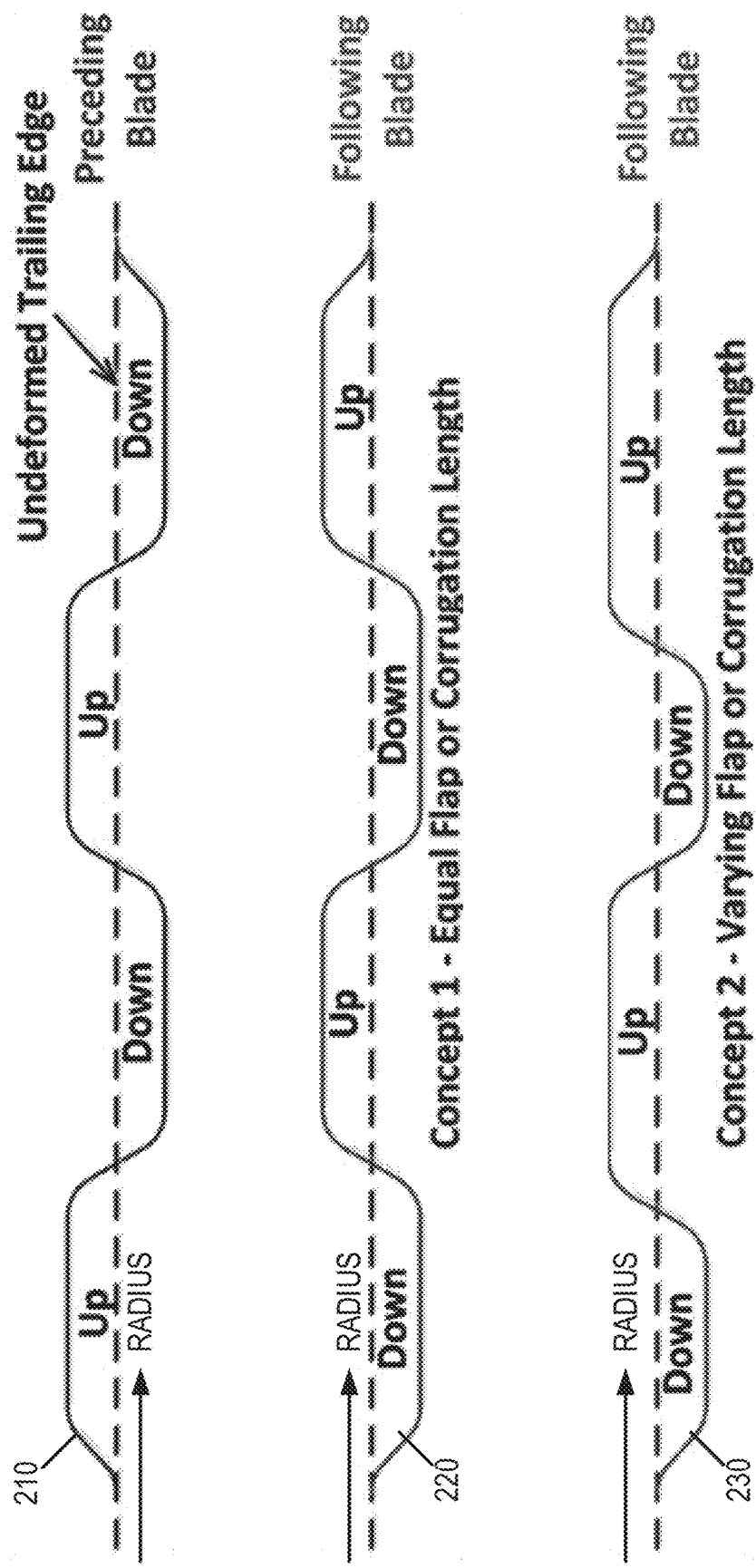
FIG. 2 is a diagram of anti-phase alternating trailing edge designs 200, according to an example embodiment.

FIG. 2 is a diagram of anti-phase alternating trailing edge designs 200, according to an example embodiment. An alternating pattern created by a passive built-in shape or by a series of active mini-trailing edge flaps may be deployed along the spanwise direction on a given rotor blade, such as shown in FIG. 1. This modification of the spanwise blade loading may significantly influence the rotor blade vortex structure, and may provide noise-reduction advantages over vibration-reducing configurations that focus on unequal blade numbers, unequally spaced rotor blades, or varying stator blade stagger angles.

Then the trailing edge on the rotor blade that follows has an anti-phase pattern. As shown in FIG. 2, this may include an anti-phase trailing edge on a preceding blade 210 incorporating an alternating pattern and anti-phase following blade 220 or anti-phase following blade 230. Blade 220 may include an equal flap or corrugation length, which may be 180° out of phase with respect to the anti-phase trailing edge pattern on the preceding blade 210. For example, if a given passive trailing edge or active flap on the preceding blade 210 is deflected downward, then the passive trailing edge or active flap on the following blade 220 at approximately the same radius would be deflected upward. Blade 230 may include an unequal flap or corrugation length, which may be include portions in phase and out of phase with respect to the anti-phase trailing edge pattern on the preceding blade 210.

Figure 3:
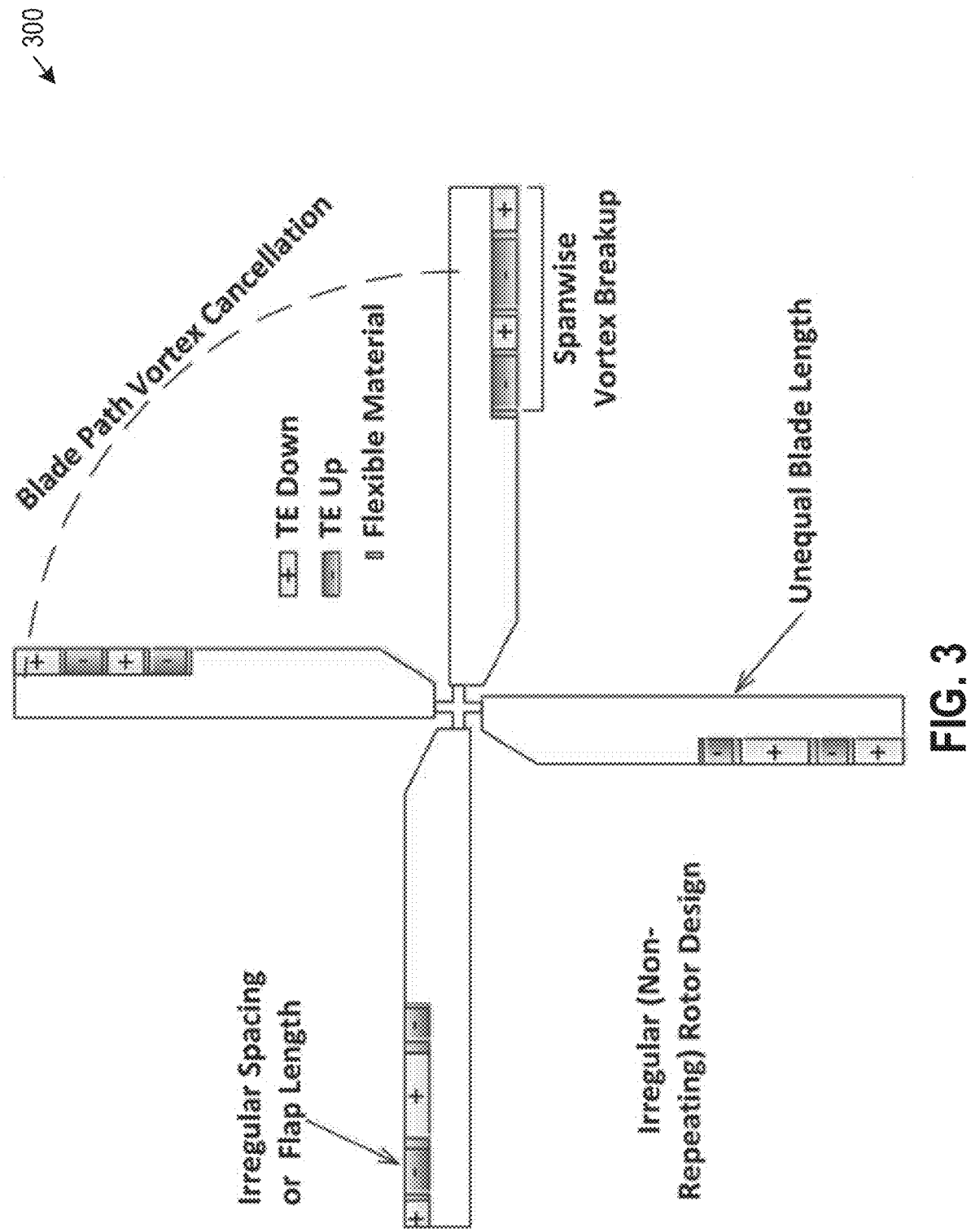
FIG. 3 is a diagram of anti-phase multiple airfoil design 300, according to an example embodiment.

FIG. 3 is a diagram of anti-phase multiple airfoil design 300, according to an example embodiment. To break up the harmonic reinforcement along the blade span, the anti-phase pattern may be applied over several segments of the trailing edge with a constant length or varying length from blade to blade. This use of unequal blade length or dissimilar blade design may further disrupt harmonic reinforcement of vortex structures during the blade passage. The individual blades could have different blade length, blade chord, blade trailing edge flaps, and blade tip design. FIG. 3 illustrates a blade at 12 o'clock having a trailing edge or flap deflected downward. Then, the following blade at 3 o'clock has a trailing edge or flap deflected upward at approximately the same radius. In some embodiments, an upward curved blade tip is further employed for rotor noise reduction, such as shown and described with respect to FIG. 9. Various combinations of non-planar blade configurations may be used in a single rotor design, where each pair of blades may be selected to reduce or eliminate the effects of the vortex structure shed by each preceding blade on each trailing blade.

Another embodiment is a similar design for a passive leading edge or active mini-leading edge slats. These trailing edge features and leading edge features may also be designed into a rotor as a fixed rotor geometry. Acoustic test data have shown that the anti-phase trailing edge rotor design produces lower noise than a conventional rotor design. It also produces higher thrust at the same rotational speed. As a result, for the same thrust as compared to the conventional rotor design, the tonal noise due to blade passing frequency is also reduced by the anti-phase trailing edge rotor design.

The anti-phase trailing edge can be accomplished by either a passive design or active design. A passive design has the advantage of design simplicity, and may be used to reduce or eliminate noise during hover or descent. In contrast, an active design may provide improved operational flexibility and aerodynamic performance, including reducing blade losses and increasing rotor power. This non-planar design may be facilitated by passive or active anti-phase trailing edges, such as shown in FIGS. 4-5 and described below.

Figure 4:
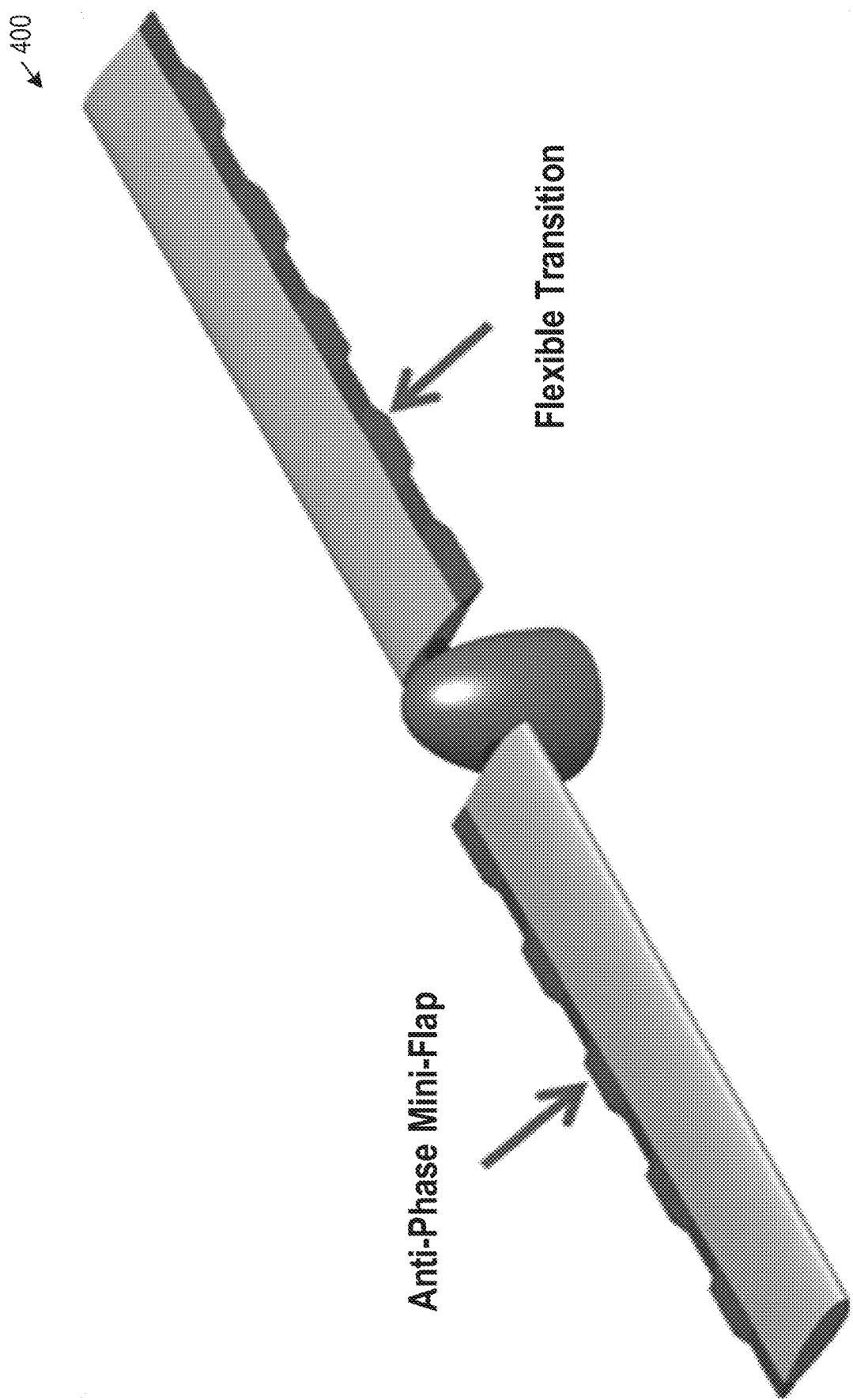
FIG. 4 is a diagram of a rigid continuous trailing edge design 400, according to an example embodiment.

FIG. 4 is a diagram of a rigid continuous trailing edge design 400, according to an example embodiment. Rigid design 400 may implement the anti-phase pattern over several segments of the trailing edge using rigid mini-trailing edge flaps. The mini-trailing edge flaps would be connected via a flexible transition material to seal the flap gaps, where the flap gap sealing may reduce or eliminate noise generated by a discontinuous gap transition.

The mini-trailing edge flaps may be used to implement an active anti-phase design. An active rigid design may include a series of actuated anti-phase mini-flaps with a continuous trailing edge feature. The mini-flap actuators may be used to adjust the anti-phase trailing edge pattern as needed, or may be used to restore the trailing edge to a conventional undeformed state for improved rotor performance during cruise. The continuous trailing edge in an active design may be enabled by a flexible transition section in between the actuated mini-flaps.

Figure 5:
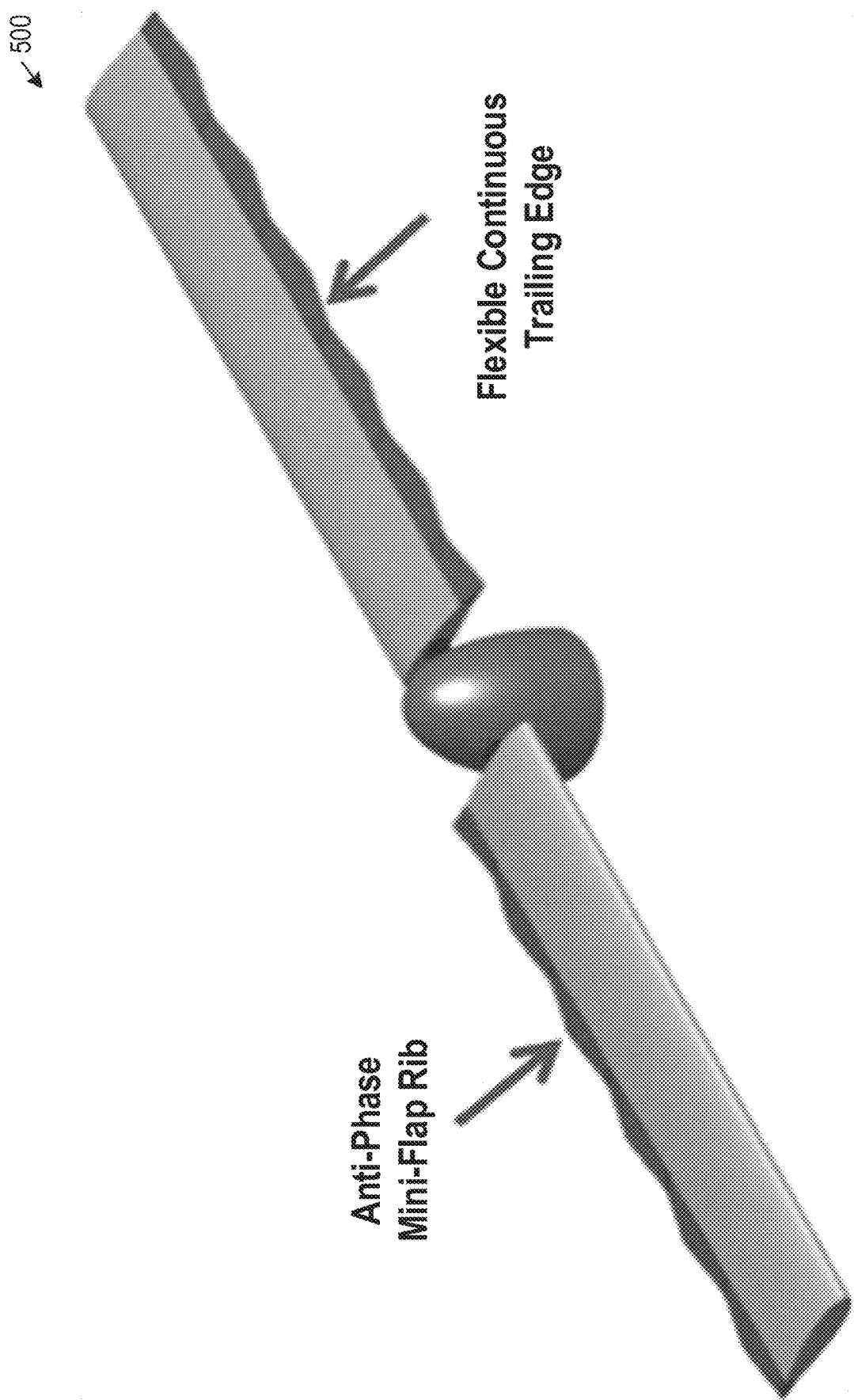
FIG. 5 is a diagram of flexible continuous trailing edge design 500, according to an example embodiment.

FIG. 5 is a diagram of flexible continuous trailing edge design 500, according to an example embodiment. Flexible design 500 may implement the anti-phase pattern over several segments of the trailing edge using a series of adjustable ribs with a continuous trailing edge. In some embodiments, ribs are connected via a flexible transition material to seal the gaps between ribs, where the flap gap sealing may reduce or eliminate noise generated by a discontinuous gap transition. The adjustable ribs and continuous trailing edge configuration provide the ability to adjust the anti-phase trailing edge pattern as needed or restore the trailing edge to a conventional undeformed state for improved rotor performance during cruise. The continuous trailing edge in an active design may be enabled by a flexible skin over the entire trailing edge surface with ribs.

Figure 6:
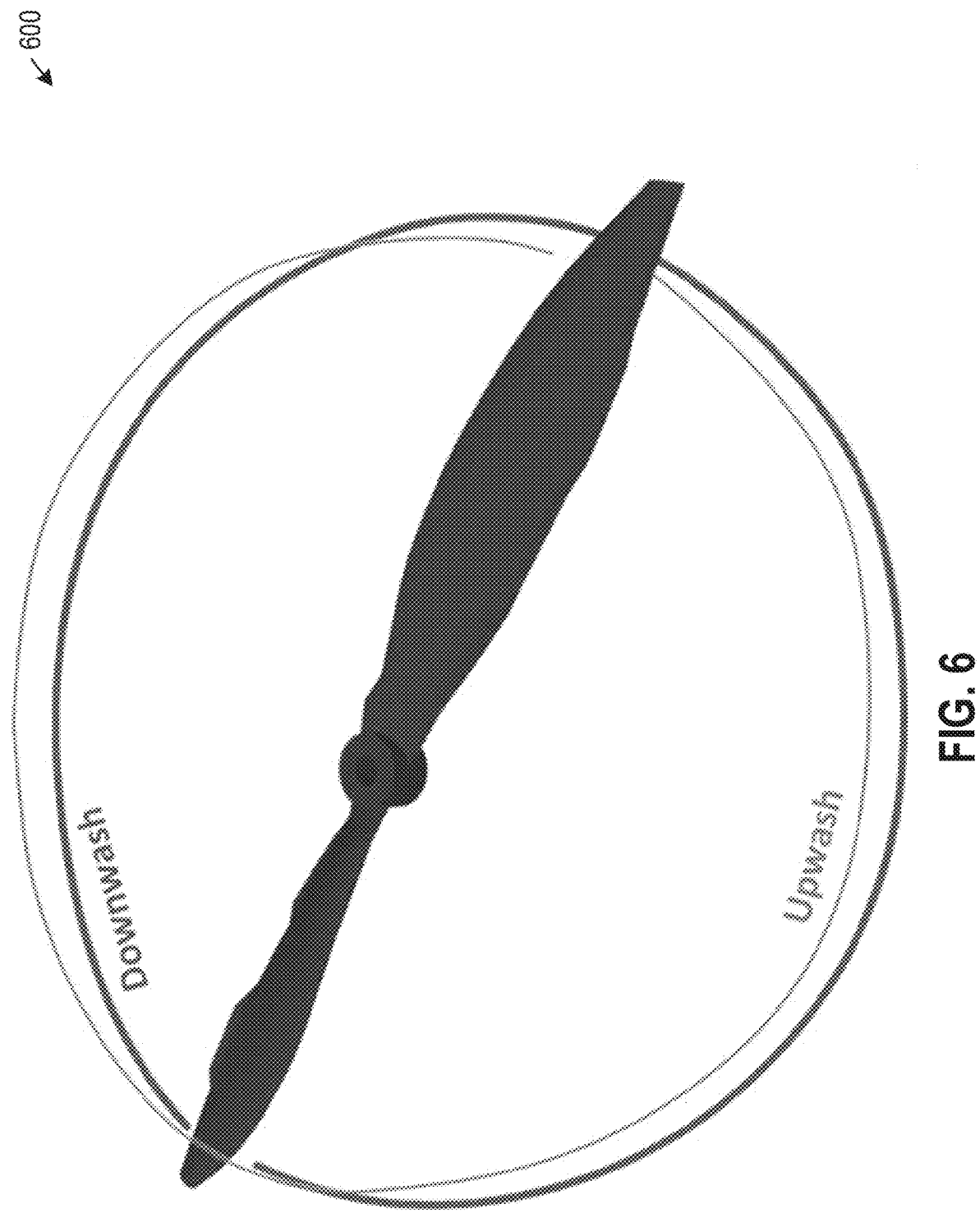
FIG. 6 is a perspective diagram 600 of a noise-reducing airfoil pair, according to an example embodiment.

FIG. 6 is a perspective diagram 600 of a noise-reducing airfoil pair, according to an example embodiment. The airfoil pair may include a downwash airfoil with a downward deflected trailing edge and an upwash airfoil with an upward deflected trailing edge. Because of the downward deflected trailing edge of the preceding airfoil, its downwash wake may bypass the following blade instead of impinging on the following blade. Similarly, the upward deflected trailing edge of the following airfoil creates an upwash wake that may bypass the preceding blade instead of impinging on the preceding blade. A cross-sectional view of the airfoil pair may be seen in FIG. 7.

Figure 7:
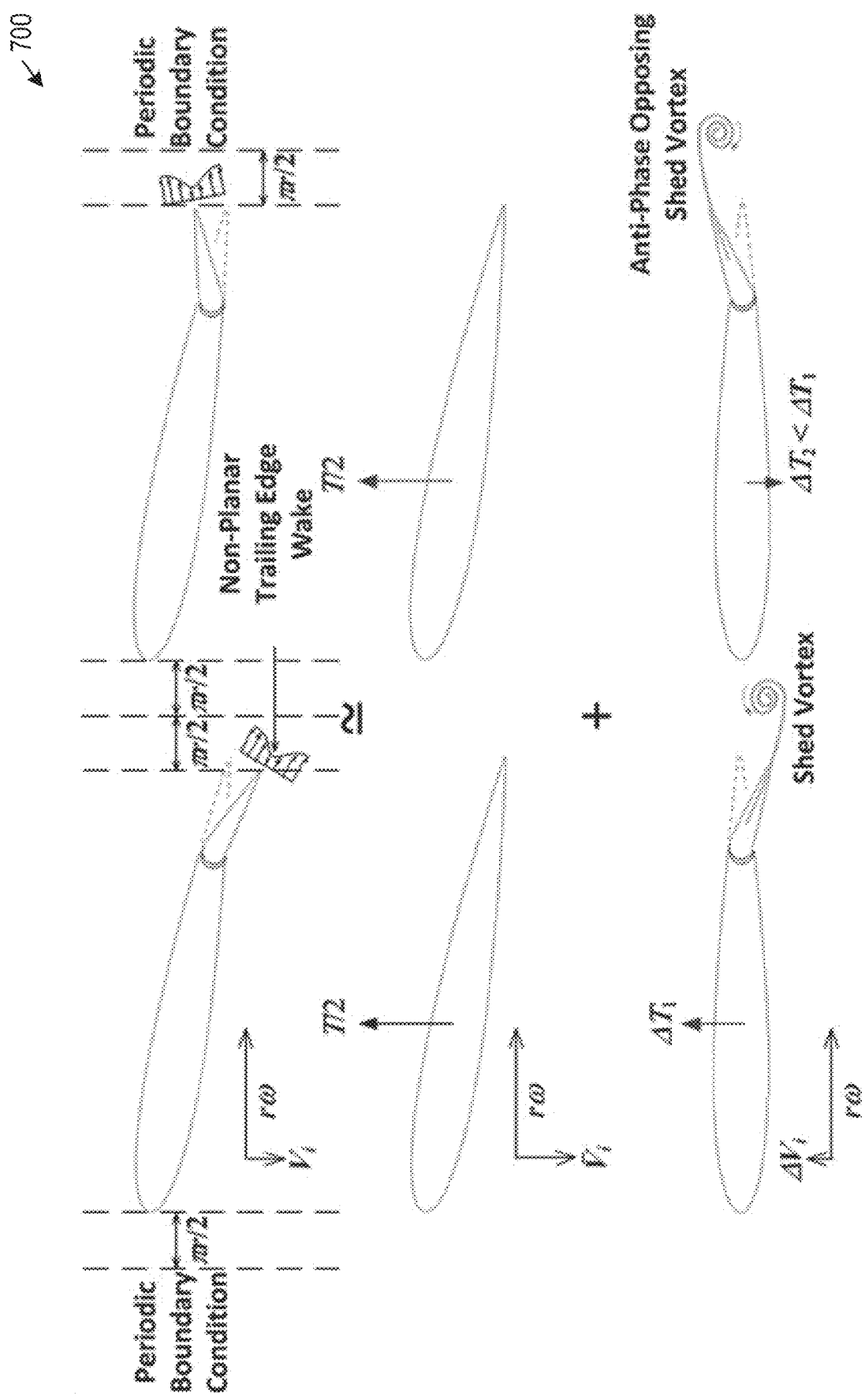
FIG. 7 is a cross-sectional diagram 700 of a noise-reducing airfoil pair, according to an example embodiment.

FIG. 7 is a cross-sectional diagram 700 of a noise-reducing airfoil pair, according to an example embodiment. As shown in FIG. 7, two rotor airfoils at a given radial station may be modeled using a periodic boundary condition at the inlet of the preceding rotor airfoil with a downward deflected trailing edge and at the exit of the following rotor airfoil with an upward deflected trailing edge. The downward deflected trailing edge of the preceding rotor airfoil creates an incremental up-lift. The upward deflected trailing edge of the following rotor airfoil creates an incremental down-lift. The airflow over the downward deflected trailing edge of the preceding rotor airfoil is more favorable than the airflow over the upward deflected trailing edge of the following rotor airfoil for the same amount of trailing edge deflection. Therefore, the incremental up-lift produced by the downward deflected trailing edge of the preceding rotor airfoil is larger than the incremental down-lift. Consequently, an overall thrust is produced by the anti-phase noise-reducing airfoil pair. The net up-lift therefore can enable the anti-phase rotor to operate at a lower revolutions per minute (RPM) for the same thrust requirement as a conventional rotor. The lower RPM reduces the tonal noise produced by the blade passing frequency. A velocity contour plot of airfoil pair may be seen in FIG. 8.

Figure 8:
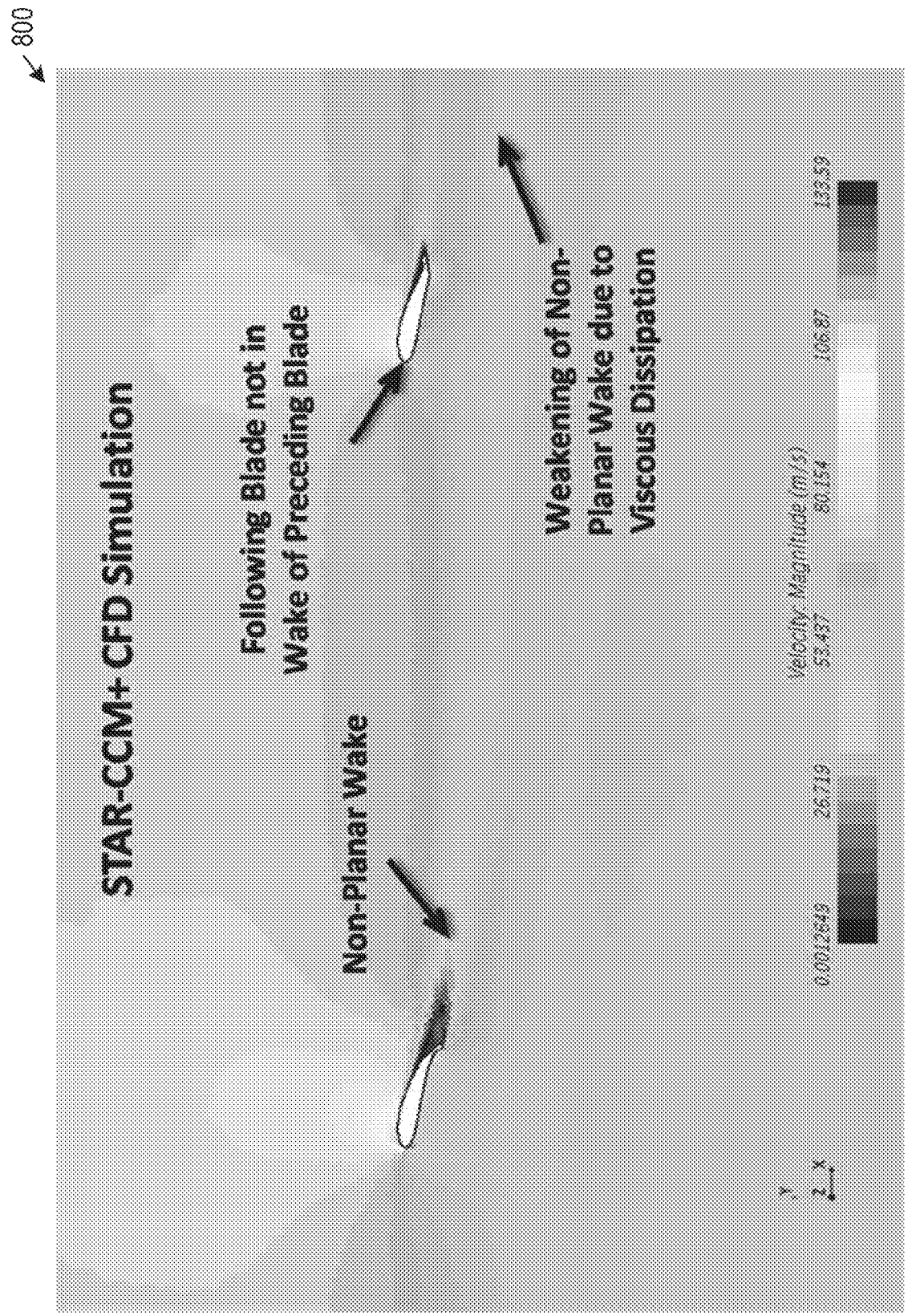
FIG. 8 is a velocity contour plot 800 of a noise-reducing airfoil pair, according to an example embodiment.

FIG. 8 is a velocity contour plot 800 of a noise-reducing airfoil pair, according to an example embodiment. The velocity contour plot 800 may be generated using a computational fluid dynamics (CFD) simulation of the periodic boundary condition shown in cross-sectional diagram 700. As can be seen in the velocity contour plot 800, the non-planar wake from the downward deflected trailing edge of the preceding airfoil substantially bypasses the following blade. The two wakes of unequal strength can be seen to be non-interacting, thereby reducing the blade vortex interaction.

Figure 9:
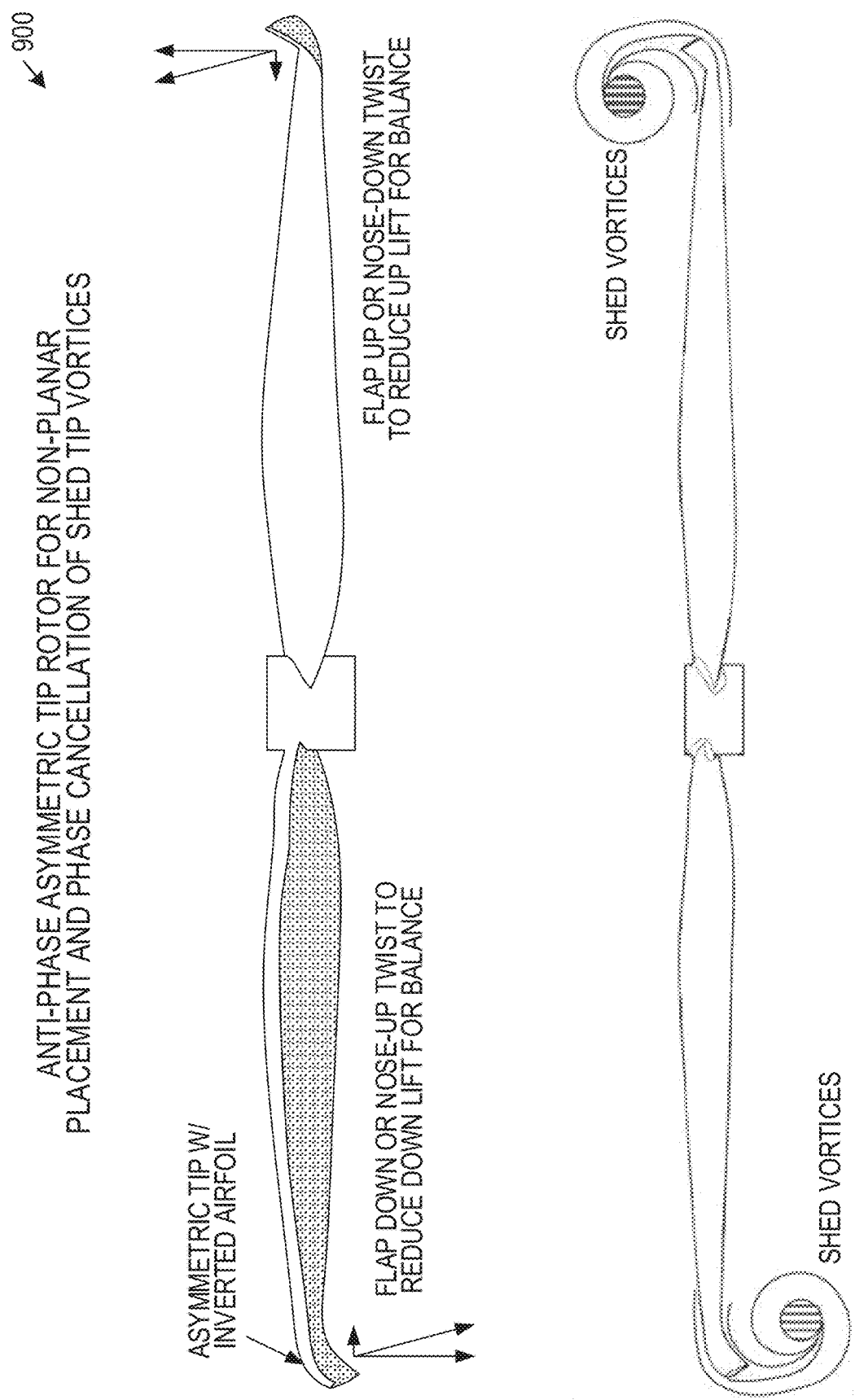
FIG. 9 is a diagram of an anti-phase asymmetric tip rotor 900, according to an example embodiment.

FIG. 9 is a diagram of an anti-phase asymmetric tip rotor 900, according to an example embodiment. The asymmetric tip rotor 900 may be used to create non-planar shed tip vortices. The anti-phase asymmetric tip rotor 900 generates a pair of co-rotating tip vortices in the direction of each wingtip, which create an offset between the two tip vortices. These non-planar shed vortices would reduce or prevent the effects of shed vortices from each blade tip from interfering with following blades. For example, the shed vortices from the preceding blade may be prevented from directly impinging onto the following blade. This may reduce or eliminate unsteady blade loading and noise.

To eliminate the force imbalance in the radial direction with the asymmetric curved blade tips, the diametrically opposite curve blade tips may employ an inverted airfoil design. The inverted airfoil design may further include a typical airfoil section with a positive camber employed everywhere on the main blade surface, which transitions to an airfoil with zero camber near the blade tip region and a negative camber in the blade tip region. An inverted airfoil design would create an opposing force to that created by the other curved blade tips, thereby eliminating the force imbalance in both the radial and axial directions. Moreover, it is possible to combine the asymmetric curved blade tips and symmetric curved blade tips with the anti-phase rotor design for the trailing edge or leading edge. In particular, with respect to the asymmetric curved blade tips, the upward curved blade tips could include a positive or downward trailing edge or leading edge setting in the blade portions next to the blade tips. Conversely, the downward curved blade tips could include a negative or upward trailing edge or leading edge setting in the blade portions next to the blade tips. In this arrangement, a positive lift is generated in the region of the upward curved blade tips and a downward negative lift is generated in the region of the downward curved blade tips. The shed vortices as a result of lift generation would be in an anti-phase pattern. Moreover, the shed vortices are also non-planar. These features could result in a noise reduction and structural dynamic attenuation. Acoustic test data indicates such an asymmetric curved blade tip provides improved noise reduction.

Figure 10:
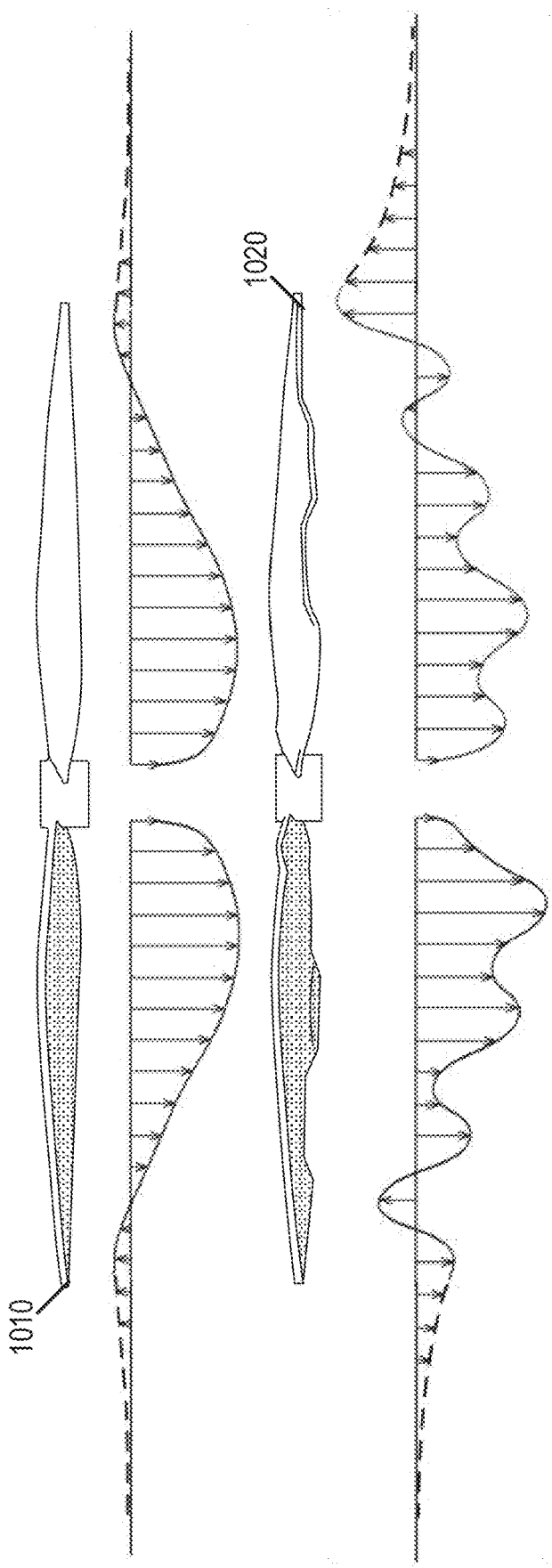
FIG. 10 are downwash comparison plots 1000 of an anti-phase trailing edge rotor, according to an example embodiment.

FIG. 10 are downwash comparison plots 1000 of an anti-phase trailing edge rotor, according to an example embodiment. FIG. 10 compares lift created by a conventional rotor with undeflected trailing edge 1010 in comparison to the anti-phase trailing edge rotor with an alternating trailing edge pattern 1020. The use of the alternating trailing edge pattern 1020 provides improved noise reduction over the conventional rotor 1010. The incremental up-lift created by the downward deflected trailing edge in the alternating trailing edge pattern 1020 is greater than the incremental down-lift created by the upward deflected trailing edge. This results in a net overall increase in thrust at the same rotor speed in the alternating trailing edge pattern 1020. Alternatively, the rotor speed of the alternating trailing edge pattern 1020 may also be reduced to achieve the same amount of thrust as the conventional rotor with undeflected trailing edge 1010, thereby lowering the tonal noise generated by the blade passing frequency.

Figure 11:
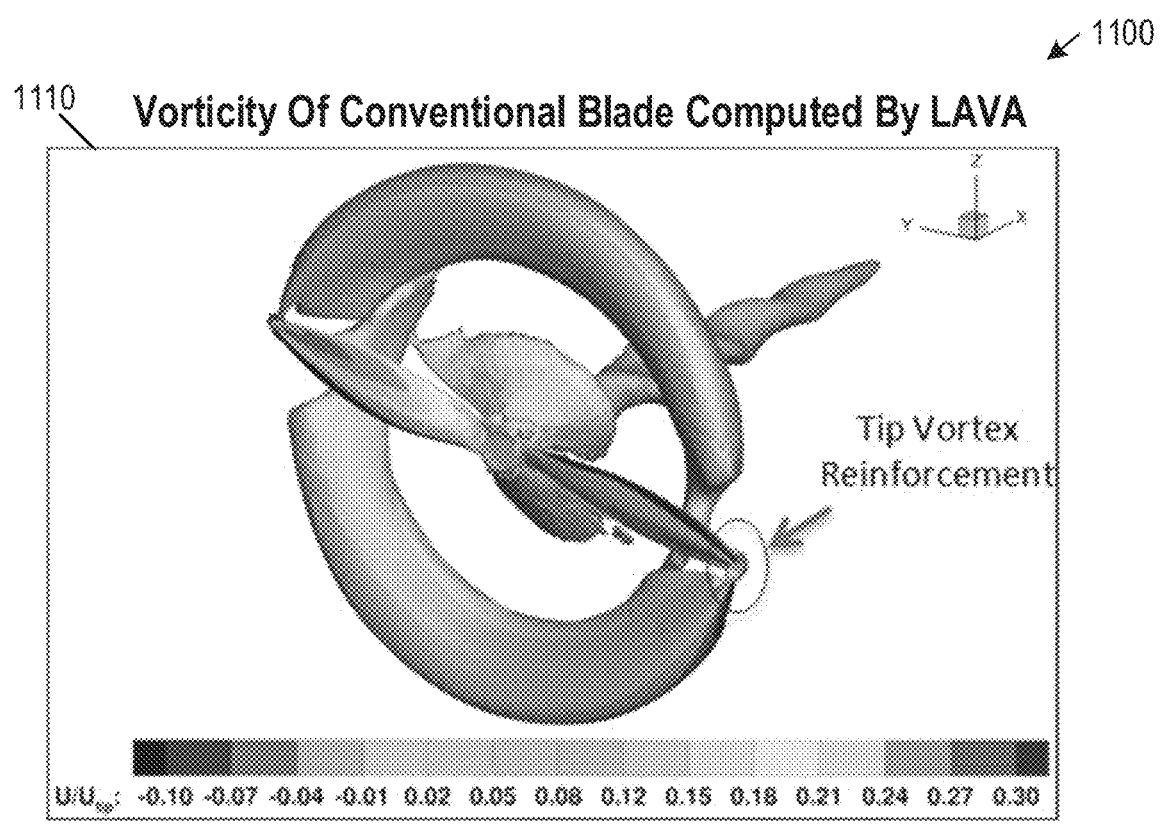
FIG. 11 are velocity contour plots 1100 of an anti-phase asymmetric tip rotor, according to an example embodiment.
Figure 11:
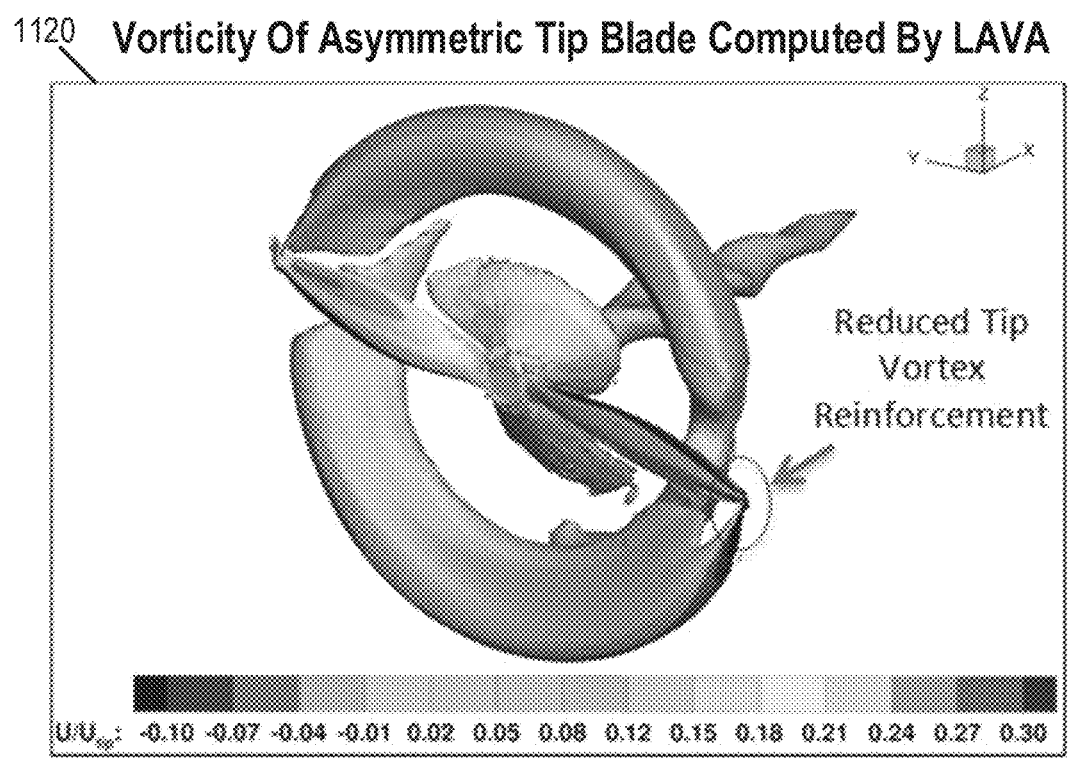

FIG. 11 are velocity contour plots 1100 of an anti-phase asymmetric tip rotor, according to an example embodiment. As can be seen in velocity contour plots 1100, the vorticity at the blade tip of the conventional straight blade design vorticity 1110 has a higher accumulation than that of asymmetric blade tip design vorticity 1120. This difference in vorticity accumulation indicates a reduction in the harmonic reinforcement of the blade tip vortex structure, which indicates the asymmetric blade tip design may provide improved noise reduction. Because the tip vortices are in opposite directions, this reduces or eliminates the effect of the following blade flying into the wake created by the tip vortex of the preceding blade, thereby resulting in lower noise.

Figure 12:
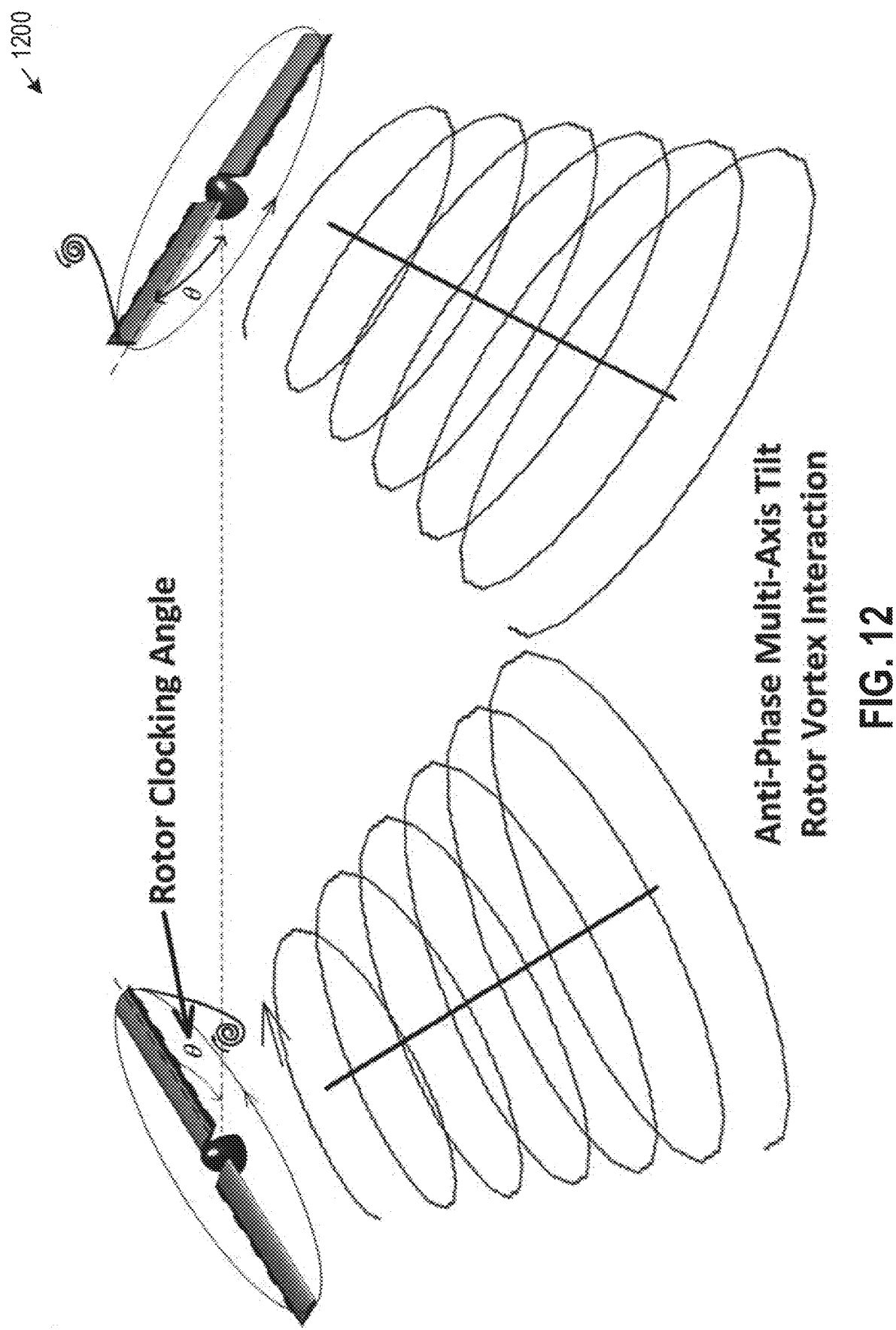
FIG. 12 is a diagram of a vortex interaction 1200, according to an example embodiment.

FIG. 12 is a diagram of a vortex interaction 1200, according to an example embodiment. In addition to the anti-phase trailing blade edge and asymmetrical blade tip structures, the rotor clocking angle of one or more multi-axis tilt rotors may be modulated to reduce noise footprint and rotor-to-rotor acoustic interactions. This multi-axis tilt rotor design with blade noise reduction technologies may provide active noise control, such as by directing propagation of the rotor noise source away from noise-sensitive targets. Various combinations of stationary and multi-axis tilt rotors may be used, such as stationary rotors to provide hover, forward tilt rotors for conventional cruise, and other combinations.

Figure 13:
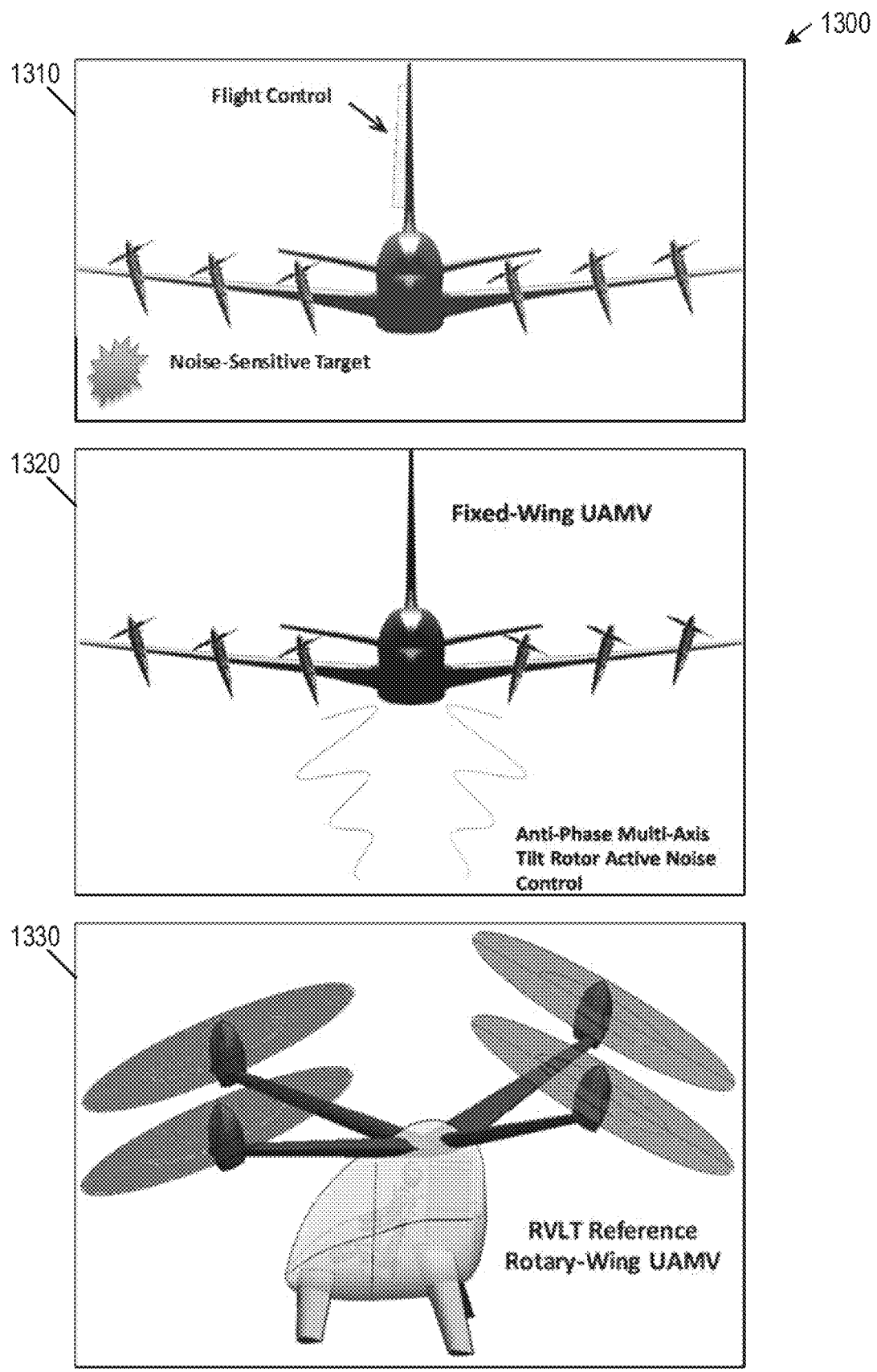
FIG. 13 is a diagram of noise mitigation flight vehicle designs 1300, according to an example embodiment.

FIG. 13 is a diagram of noise mitigation flight vehicle designs 1300, according to an example embodiment. The rotor designs described herein may be employed integrally in an aircraft or flight vehicle control system design, such as flight vehicle designs 1300. Vehicle designs 1300 may include various urban air mobility vehicles (UAMVs), such as fixed-wing UAMVs 1310 and 1320 or Revolutionary Vertical Lift Technology (RVLT) reference rotary-wing UAMV 1330. The present subject matter may be used to reduce or eliminate community noise for these and other UAMVs, which is seen as a technical challenge for certification of UAMVs for urban operation. These improved rotor technologies may be used to reduce UAMV noise, and may be combined with other integrated vehicle noise reduction solutions to reduce UAMV noise further. The present subject matter includes passive and active rotor noise reduction technologies for UAMV with dissimilar blade design for noise reduction to break up or prevent harmonic reinforcement of blade vortex structure using various combinations of anti-phase trailing edges, asymmetric blade tips, unequal blade length, and ducted rotors with non-radial unequally spaced struts. In an example, this active rotor noise reduction technology with continuous mini-trailing edge flaps in anti-phase patterns may be used to break up shed blade vortices, thereby reducing rotor noise sources.

In some embodiments, an aircraft is equipped with one of the rotor designs to operate advantageously to reduce noise in an urban setting. As shown in FIG. 13, fixed-wing UAMV 1310 includes a multi-axis six degrees of freedom (6-DOF) articulated rotor design whereby the rotors can be articulated in a uniform angular direction to direct the noise source away from a noise-sensitive target. The rotor control may be fully integrated with the aircraft flight control, such as the rudder, to maintain wing-level motion without undesired roll or yaw when the rotors are uniformly articulated angularly. In another embodiment shown in fixed-wing UAMV 1320, the rotors may be articulated in an anti-phase fashion whereby the rotor axes are converged either below or above the air vehicle and the motion of the rotor is asynchronously timed for anti-phase noise cancellation by rotor clocking to create opposing vortex interactions so as to prevent vortex reinforcement.

Similarly, RVLT reference rotary-wing UAMV 1330 may include a rotor design integrated with air vehicle flight control system and flight path planning using noise-sensitive trajectory optimization to advantageously control the noise propagation of the rotors. This integration of noise reduction systems with flight control systems provides advantages over non-integrated configurations, as the acoustic interactions with multiple distributed rotors in non-integrated systems could result in an increase in the noise source and level.

Multi-axis 6-DOF rotor articulation may enable the rotors to articulate uniformly in an angular direction to direct noise source away from noise-sensitive targets, or to articulate in a manner such that the rotor axes are converged above or below the aircraft for anti-phase noise cancellation by rotor clocking to reduce multi-rotor acoustic interactions. While UAMVs are shown, the present subject matter may be used in various commercial applications are for unmanned aerial systems (UAS), urban air mobility, rotorcraft, passenger aircraft, and other types of aircraft that employ rotors.

Figure 14:
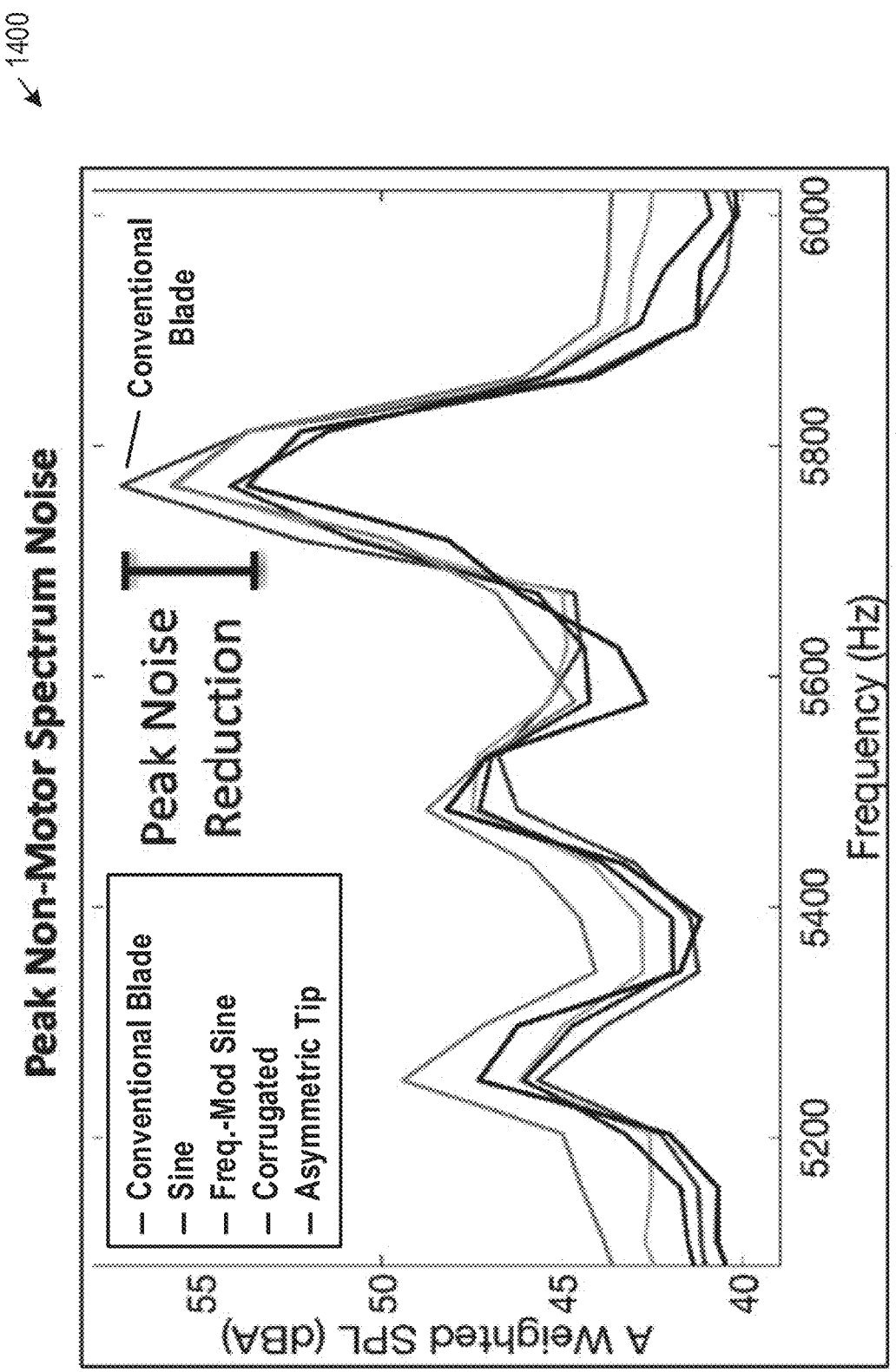
FIG. 14 is a rotorcraft operation noise graph 1400, according to an example embodiment.

FIG. 14 is a rotorcraft operation noise graph 1400, according to an example embodiment. Noise reduction graph 1400 shows peak non-motor spectrum noise as a function of frequency for various configurations of rotorcraft airfoils, including conventional straight blade rotor 110, anti-phase rotor 120 with the sine wave trailing edge design, anti-phase rotor 130 with the frequency-modulated sine wave trailing edge design, anti-phase rotor 140 with the corrugated trailing edge design, and anti-phase rotor 150 with the asymmetric tip design. The highest peak on noise graph 1400 corresponds with the maximum noise generated by the conventional rotor configuration, which is multiple dBA above the lowest peak corresponding to the asymmetric winglet configuration. This demonstrates a consistent reduction in peak blade noise. Various combinations of anti-phase trailing edge or leading edge patterns and asymmetric tips may be used to reduce noise further. Active mini-trailing edge flaps 400 or flexible continuous trailing edge design 500 with adjustable ribs may also be deployed to adjust the shape of a rotor to a particular desired anti=-phase design to further reduce noise.

Figure 15:
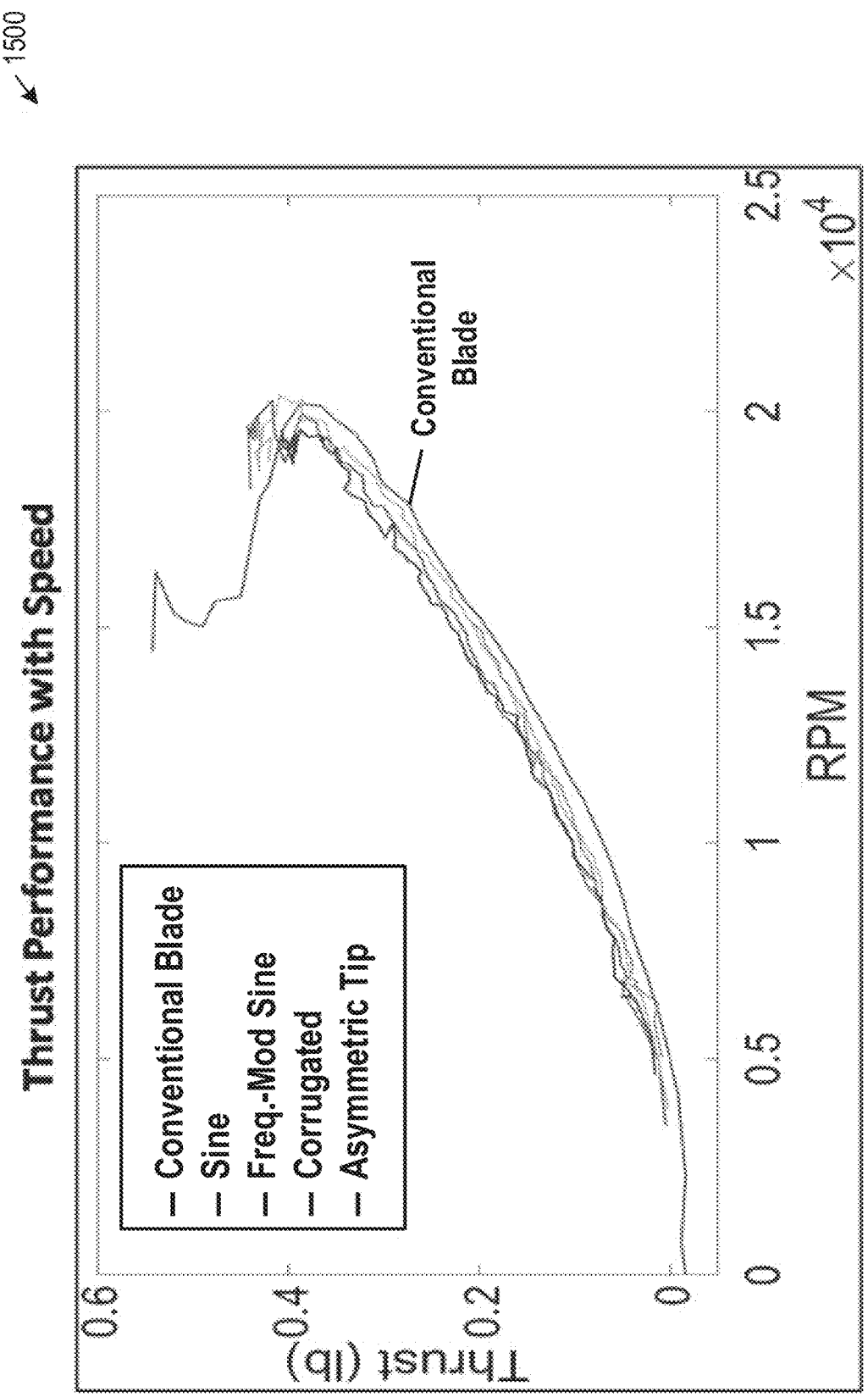
FIG. 15 is a thrust performance graph 1500, according to an example embodiment.

FIG. 15 is a thrust performance graph 1500, according to an example embodiment. Graph 1500 shows thrust relative to rotor revolutions per minute (RPM). The plot for conventional rotor 110 is shown as the curve on the far right, indicating that conventional rotor 110 produces the same thrust at a higher RPM than all of the anti-phase rotors including anti-phase rotor 120 with the sine wave trailing edge design, anti-phase rotor 130 with the frequency-modulated sine wave trailing edge design, anti-phase rotor 140 with the corrugated trailing edge design, and anti-phase rotor 150 with the asymmetric tip design. Any one or more of the noise-reducing anti-phase rotor designs 110, 120, 130, 140, and 150 may be used to provide the same thrust as conventional rotor 110 at a lower RPM for tonal noise reduction. Various combinations of these the noise-reducing anti-phase rotor designs may be used to provide a desired combination of noise reduction and thrust. Because thrust is typically reduced by noise reduction, each airfoil embodiment described herein may be analyzed to characterize the relationship between thrust and noise reduction, such as by varying RPM, hover parameters, decent parameters, and other characteristics. One or more airfoil designs may be selected to provide an improved or optimized combination of thrust and noise reduction for each aeronautic application. Active mini-trailing edge flaps 400 or flexible continuous trailing edge design 500 with adjustable ribs may also be deployed to adjust the shape of anti-phase rotor to a particular desired design to increase thrust further at the same RPM.

Figure 16:
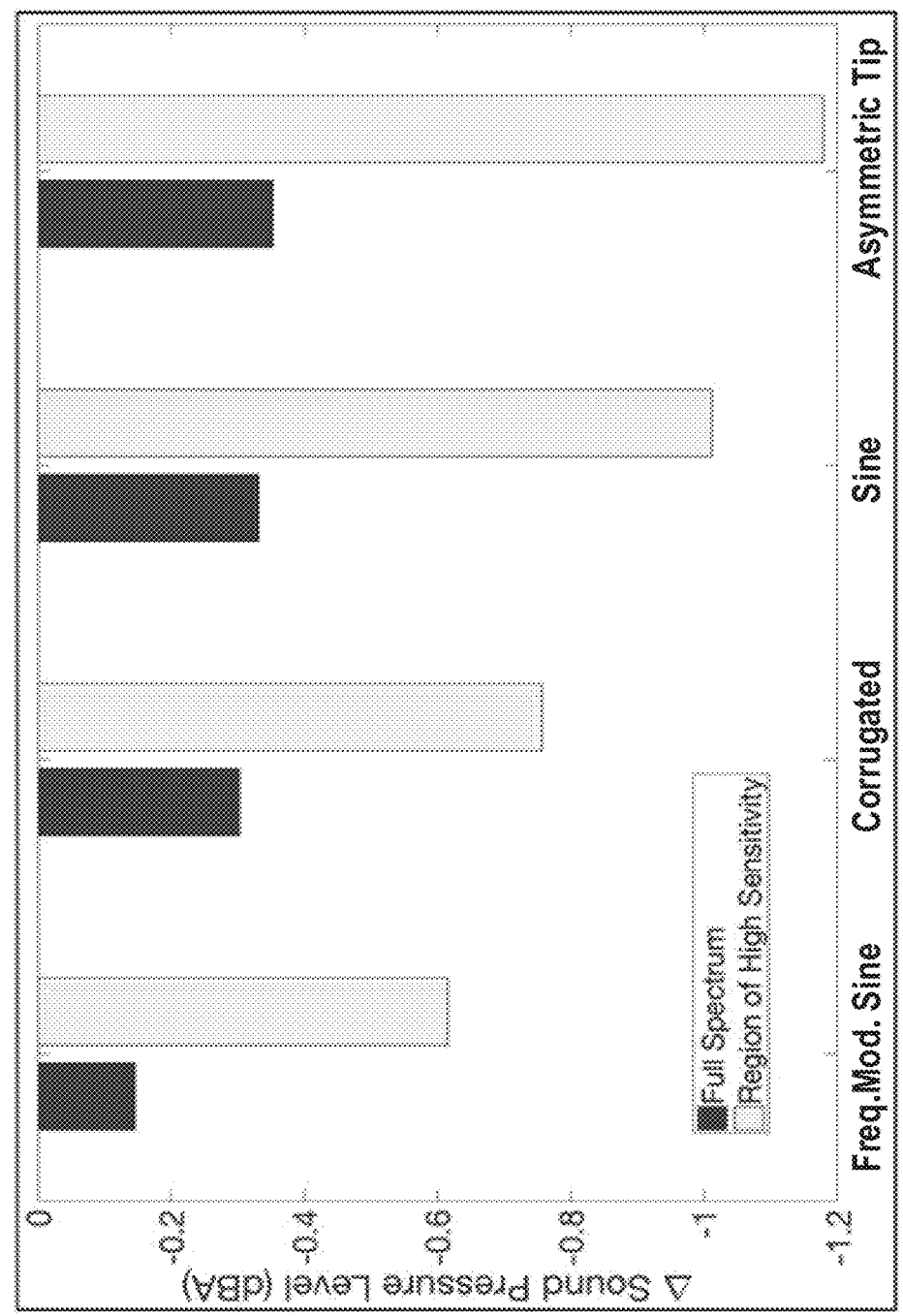
FIG. 16 is a sound pressure bar graph 1600, according to an example embodiment.

FIG. 16 is a sound pressure bar graph 1600, according to an example embodiment. Graph 1600 compares the incremental noise reduction from that of conventional rotor 110 for a hover maneuver at constant thrust for each noise-reducing anti-phase rotor design, including anti-phase rotor 120 with the sine wave trailing edge design, anti-phase rotor 130 with the frequency-modulated sine wave trailing edge design, anti-phase rotor 140 with the corrugated trailing edge design, and anti-phase rotor 150 with the asymmetric tip design. Each of these noise-reducing anti-phase rotor designs provide overall noise reduction in the full noise spectrum, and provides greatest noise reduction (e.g., greatest performance gains) in the sensitive region of the noise spectrum.

Figure 17:
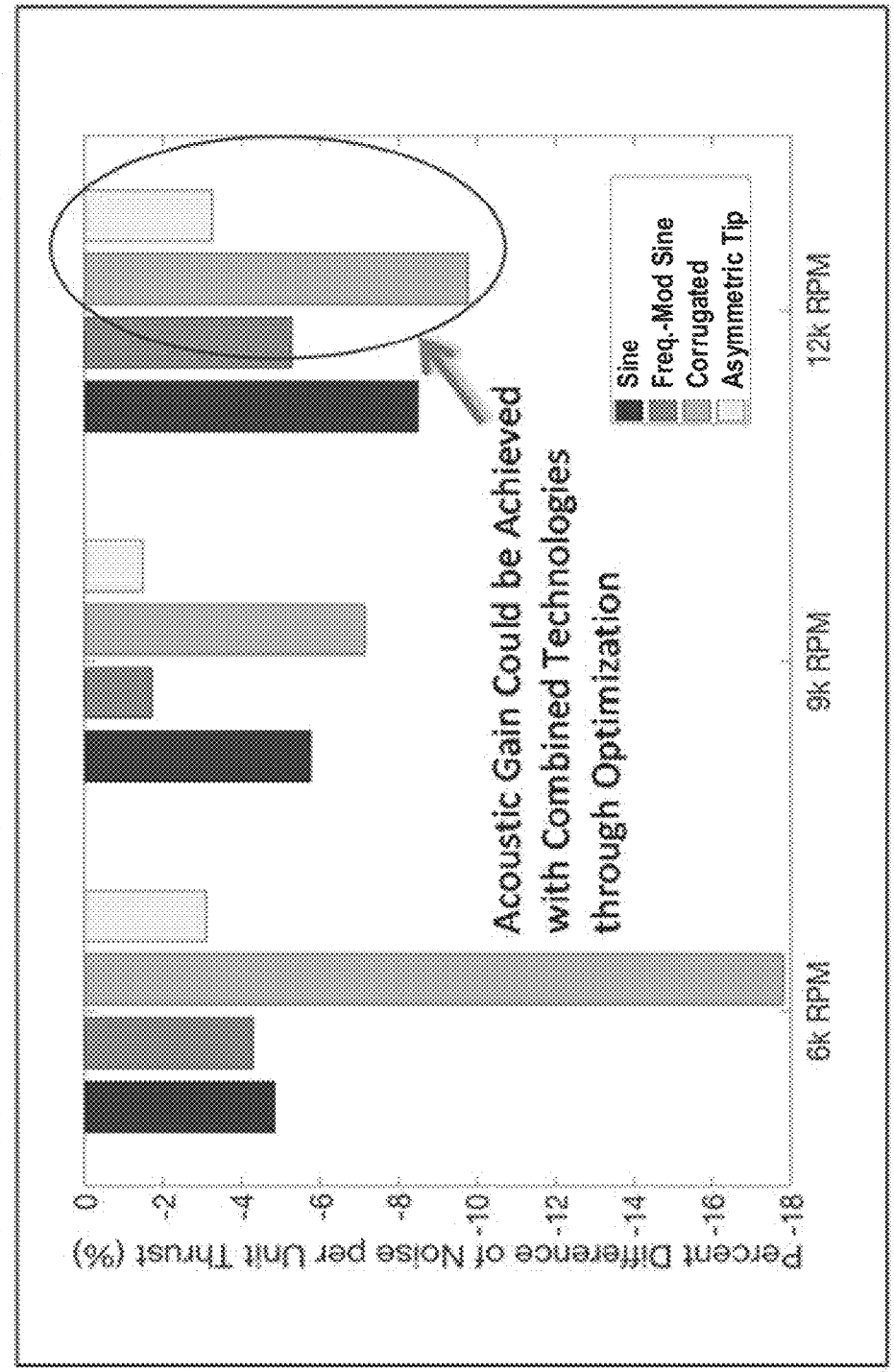
FIG. 17 is a noise reduction graph 1700, according to an example embodiment.

FIG. 17 is a noise reduction graph 1700, according to an example embodiment. Graph 1700 compares percent difference of noise reduction per unit of thrust relative to the sound pressure produced by conventional rotor 110 for a decent maneuver at different rotor speeds, including 6,000 RPM, 9,000 RPM, and 12,000 RPM. Lower RPMs generally improve noise reduction for each separate noise-reducing anti-phase rotor designs. A combination of noise-reducing anti-phase rotor designs may be optimized to improve or maximize noise reduction over a desired RPM range or over all relevant RPM ranges. An example of this optimization can be seen in FIG. 18. Active mini-trailing edge flaps 400 or flexible continuous trailing edge design 500 with adjustable ribs may also be deployed to tailor the shape of anti-phase rotor to a particular desired design as a function of the rotor speed.

Figure 18A:
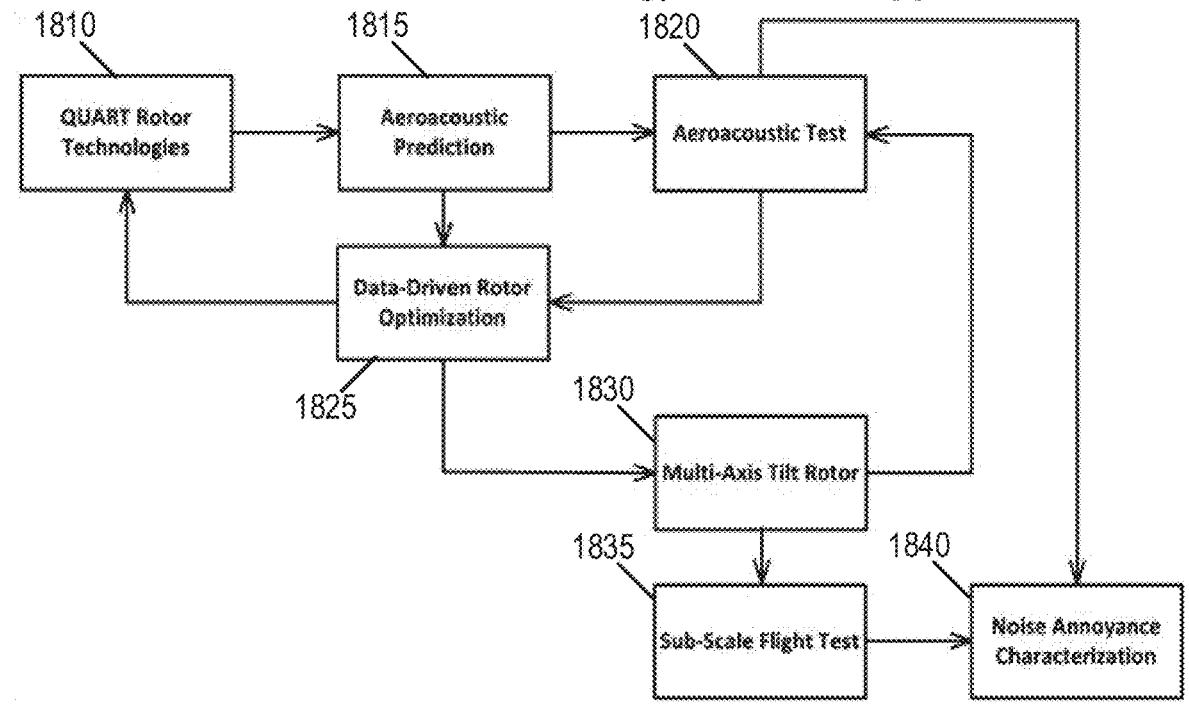
FIGS. 18A-18B are flowcharts of an Anti-Phase Rotor Technology technical approach 1800, according to an example embodiment.
Figure 18B:
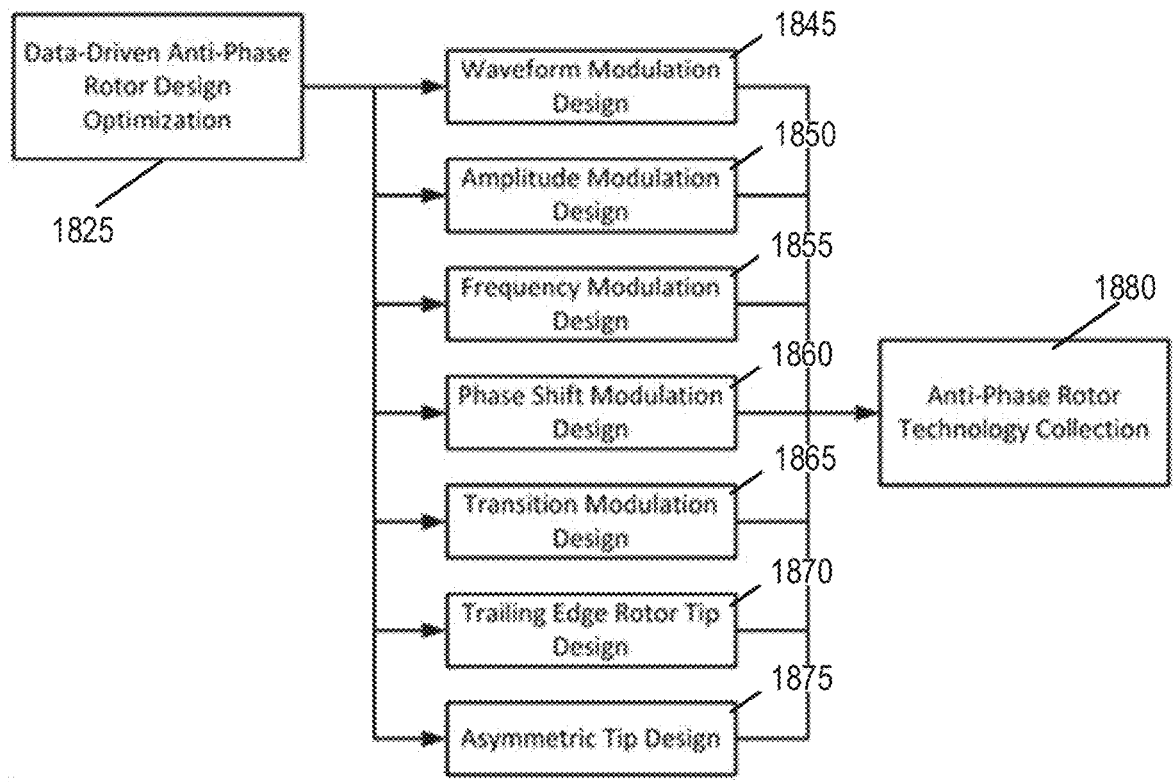

FIGS. 18A-18B are flowcharts of an Anti-Phase Rotor Technology technical approach 1800, according to an example embodiment. The technical approach may begin with selecting a combination of one or more anti-phase rotor technologies 1810 in a particular configuration, such as anti-phase trailing edges, asymmetrical wingtips, rotor clocking angle modulation, and other anti-phase technologies. For each combination of noise-reducing anti-phase rotor technologies, and aeroacoustic prediction 1815 may be used to predict the noise profile over various RPM ranges and in various flight scenarios. An aeroacoustic test 1820 may be used to characterize the acoustic profile of the configuration. The aeroacoustic prediction 1815 and the aeroacoustic test 1820 may be used in data-driven rotor optimization 1825, such as to select a different combination of noise-reducing anti-phase rotor technologies.

Once optimized, the data-driven anti-phase rotor optimization 1825 may be used to produce a multi-axis tilt rotor 1830. The multi-axis tilt rotor 1830 may be used in one or more subsequent aeroacoustic tests 1820, which may drive a revised data-driven anti-phase rotor optimization 1825 and lead to a revised multi-axis tilt rotor 1830. The multi-axis tilt rotor 1830 may be used in a sub-scale flight test 1835, such as to generate and evaluate a scale model of the multi-axis tilt rotor 1830. The sub-scale flight test 1835 may be used in a noise annoyance characterization 1840, such as to validate the effectiveness of the selected combination of noise-reducing anti-phase rotor technologies.

Various anti-phase rotor design methods are employed by the data-driven anti-phase rotor optimization 1825 are shown in FIG. 18B. These anti-phase rotor design methods include the waveform modulation design method 1845, amplitude modulation design method 1850, frequency modulation design method 1855, phase shift modulation design method 1860, transition modulation design method 1865, trailing edge rotor tip design method 1870, and asymmetric tip design method 1875. All of these anti-phase design methods contribute to an anti-phase rotor technology collection 1880 and can be employed synergistically to produce a desired anti-phase rotor design for noise and vibration reduction.

FIGS. 19A-19E show trailing edge waveforms of various candidate anti-phase rotor designs 1900 in the data-driven anti-phase rotor optimization 1825, according to an example embodiment. FIG. 19A, FIG. 19B FIG. 19C, FIG. 19D, and FIG. 19E show anti-phase rotor designs 4A, 4C, 3D, 4D, and 3C, respectively, from among thirteen candidate anti-phase rotor designs shown in Table 1:

TABLE 1

KDE Anti-Phase Rotor Design Candidates in Hover Condition

Figure 19A:
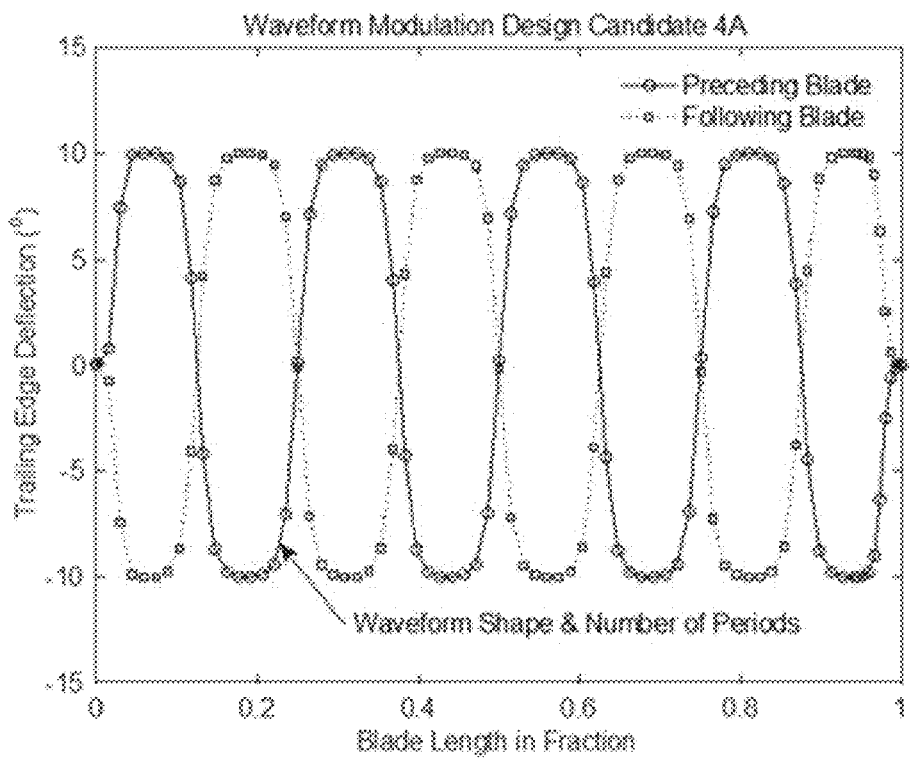
FIGS. 19A-19E show trailing edge waveforms of various candidate anti-phase rotor designs 1900 in the data-driven anti-phase rotor optimization 1825, according to an example embodiment.
Figure 19B:
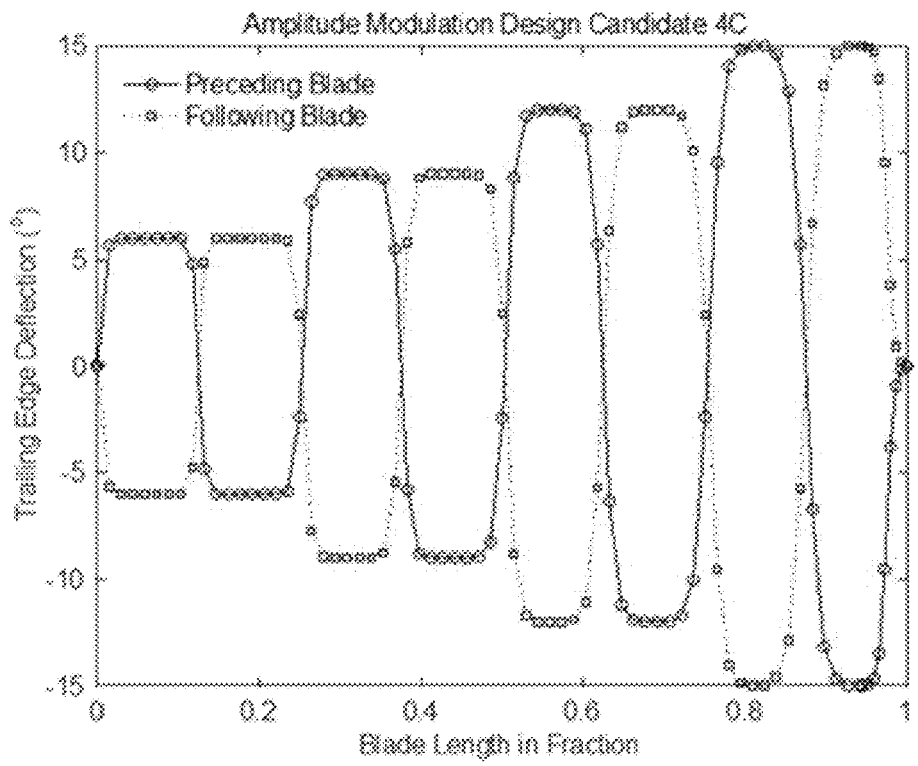
Figure 19C:
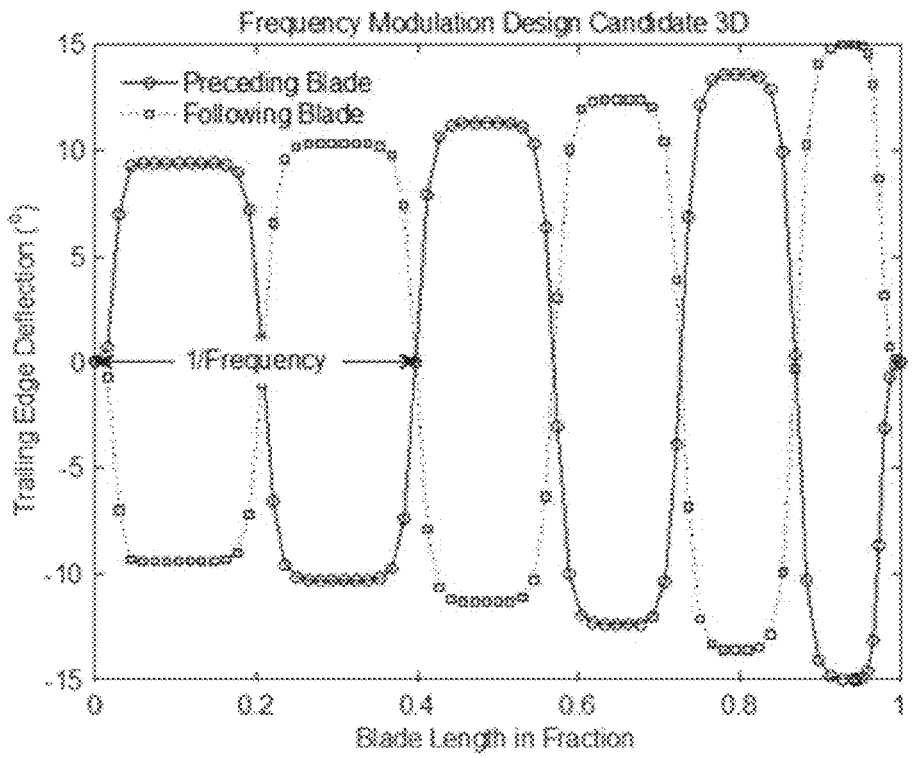
Figure 19D:
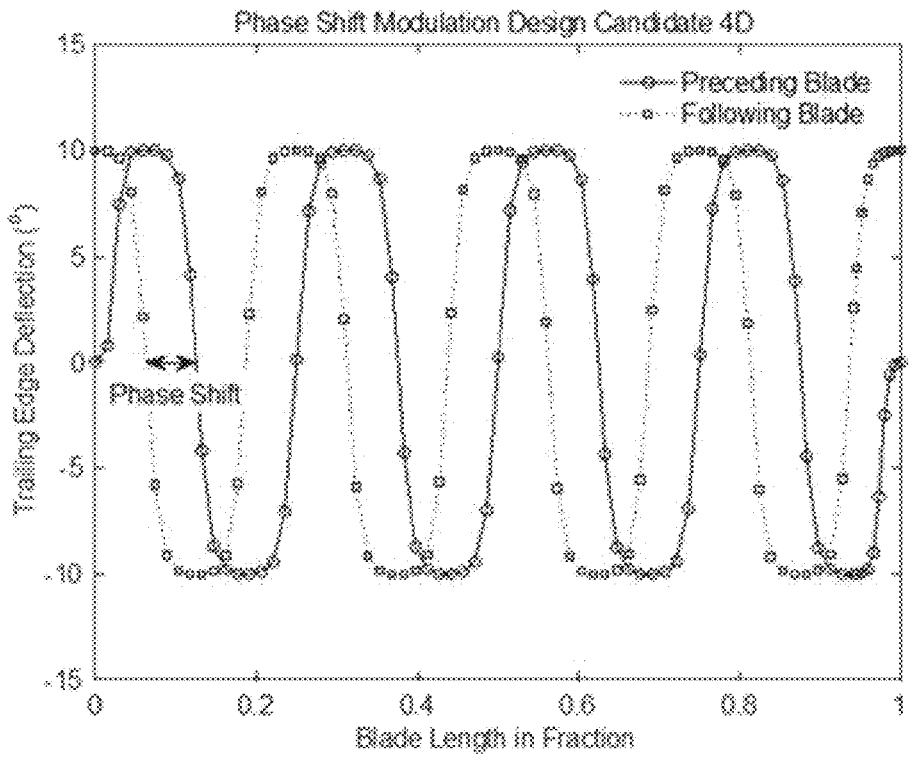
Figure 19E:
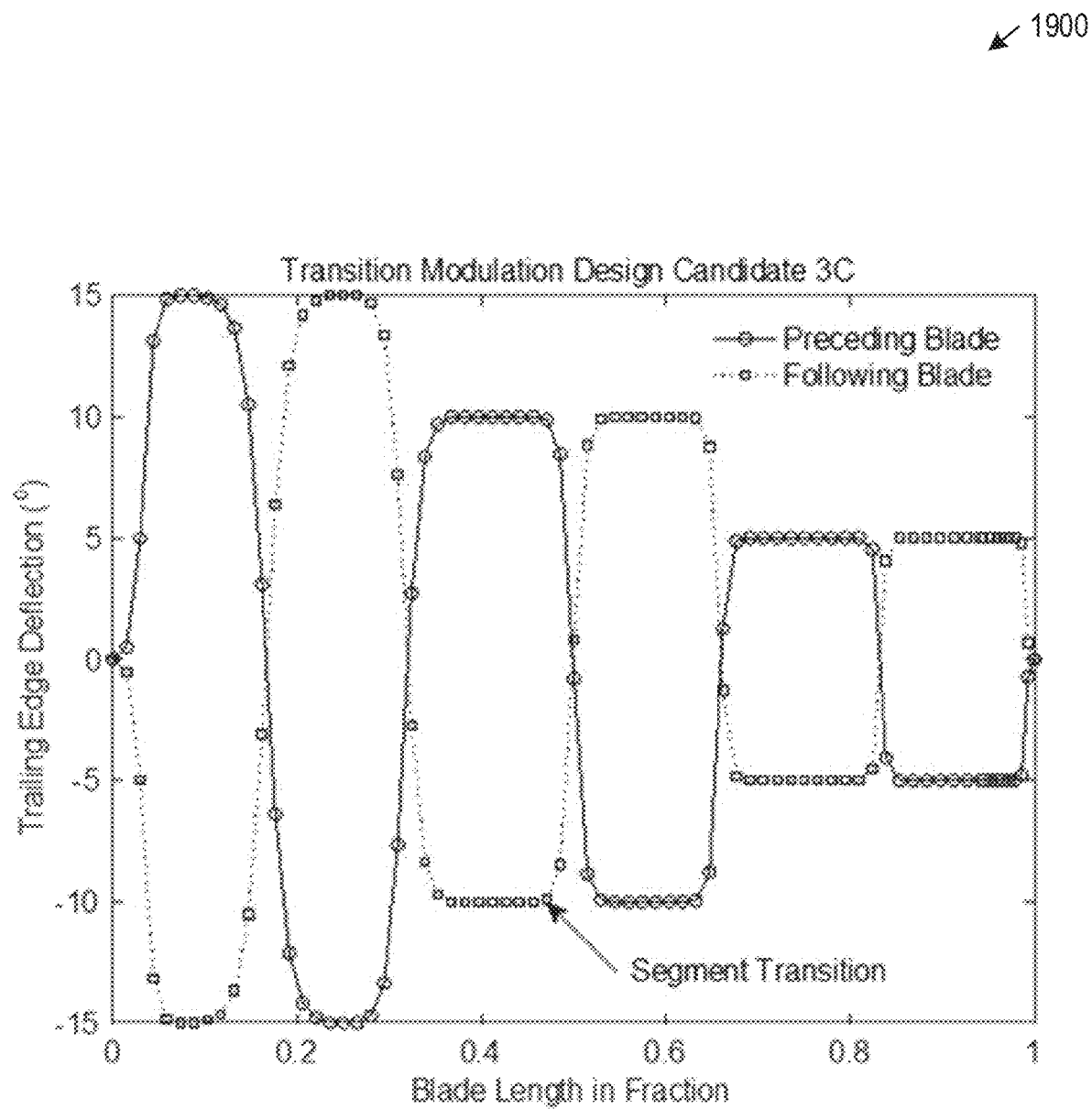

| Design Candidate | Number of Periods | Segment Length Fraction η | Deflection Amplitude (°) | Phase Shift (°) | Segment Transition (%) | Thrust Change (%) | Noise Reduction (dB) |
|---|---|---|---|---|---|---|---|
| Baseline | 0 | 1 | 0 | 0 | 0 | 0 | 0 |
| 1A | 1 | ½ | 10 | 180 | 40 | +5.0 | −1.5 |
| 2A | 2 | ¼ | 10 | 180 | 40 | +4.0 | +0.2 |
| 3A | 3 | ⅙ | 10 | 180 | 40 | +2.5 | +0.3 |
| 3B | 3 | 0.175, 0.183, 0.142 | 5, 10, 15 | 180 | 60, 50, 80 | +4.0 | +0.5 |
| 3C FIG. 19E | 3 | ⅙ | 15, 10, 5 | 180 | 80, 40, 20 | +5.0 | −0.8 |
| 3D FIG. 19C | 3 | 0.2, 0.167, 0.135 | 9, 12, 15 | 180 | 50, 60, 60 | +2.0 | +0.3 |
| 4A FIG. 19A | 4 | ⅛ | 10 | 180 | 80 | +4.0 | +2.0 |
| 4B | 4 | ⅛ | 5 | 180 | 80 | +2.1 | +1.1 |
| 4C FIG. 19B | 4 | ⅛ | 6, 9, 12, 15 | 180 | 80 | +5.1 | +2.1 |
| 4D FIG. 19D | 4 | ⅛ | 10 | 90 | 80 | −0.2 | +1.5 |
| 4E | 4 | ⅛ | 10 | 180 | 40 | +3.8 | +2.1 |
| 4F | 4 | ⅛ | 10 | 180 | 90 | +4.1 | +1.9 |
| 5A | 5 | 1/10 | 10 | 180 | 80 | +2.8 | +0.4 |

Table 1 shows a baseline conventional rotor followed by thirteen anti-phase design candidates with various design optimization parameters including alternating trailing edge waveforms, alternating trailing edge wavelength, trailing edge deflection amplitude, and degrees of transition sharpness. Each of the design candidates is designated by a numeral and a letter. Each numeral designation indicates the number of periods of the trailing edge waveform, and each letter designation indicates certain physical characteristics of the particular anti-phase trailing edge design. The nominal trailing edge deflection amplitude of the trailing edge waveform is 10° in the majority of the design candidates. The changes in thrust and noise reduction in hover condition are listed in Table 1. The rotor speed is 4000 rpm in all cases. It should be understood that the numerical values are for illustration of the data-driven anti-phase rotor optimization 1825.

In some embodiments, waveform modulation design method 1845 is a method of varying the number of periods of an anti-phase trailing edge waveform. As shown in Table 1, as the number of periods in the anti-phase trailing edge waveform increases to four while keeping all other parameters the same, the noise reduction increases to +2.0 dB corresponding to design candidate 4A, shown in FIG. 19A. The one-period waveform results in a noise increase by +1.5 dB. The five-period waveform has a lower noise reduction than the four-period waveform. In all cases, the thrust increases for all the design candidates. The waveform modulation design method 1845 also teaches a method of selecting the deflection amplitude of the trailing edge waveform. Table 1 shows design candidate 4B with a 5° deflection amplitude has less noise reduction than design candidate 4A with a 10° deflection amplitude. Increasing the deflection amplitude up to some practical limit imposed by aerodynamic performance generally provides improved noise reduction. The waveform modulation design method 1845 furthermore teaches how the shape of the waveform can affect the noise reduction of an anti-phase rotor. Different waveform shapes may be employed to provide noise reduction. In an example, the waveform may be a sine wave as one embodiment employed by the anti-phase rotor 120 in FIG. 1 with a sine waveform. The waveform may also be a corrugated shape as another embodiment employed by the anti-phase rotor 140 in FIG. 1. Referring to FIG. 16, an example embodiment of a sinusoidal waveform may provide a greater noise reduction than an example embodiment of a corrugated waveform. In general, any suitable waveform might be considered in the waveform design. It should be understood that FIG. 19A is for illustration only. Different waveform modulation designs may be employed that vary the number of periods, the deflection amplitude of the anti-phase trailing edge waveform, and the waveform shape in an advantageous manner so as to reduce noise.

Another method employed by the data-driven anti-phase rotor optimization 1825 is the amplitude modulation design method 1850 whereby the deflection amplitude of each segment length varies along the rotor radius. One such design candidate is 3B, which employs a three-period trailing edge waveform with a varying trailing edge deflection amplitude from 5° at the blade root to 15° at the blade tip. Another such design candidate is 3C, which employs a reverse trailing edge deflection amplitude. Yet another design candidate is 4C, which employs a four-period trailing edge waveform with a varying trailing edge deflection amplitude that increases along the rotor radius from 6° at the blade root to 15° at the blade tip. FIG. 19B shows design candidate 4C which provides significant improvement in the hover condition, including a 5.1% increase in thrust and +2.1 dB noise reduction. As can be seen in Table 1, design candidate 4C provides the greatest improvements in thrust and noise reduction. As shown in Table 1, increasing the trailing edge deflection amplitude modulation toward the blade tip generally produces an increase in the noise reduction, and conversely, noise reduction is decreased as trailing edge deflection amplitude modulation is decreased toward the blade tip. It should be understood that FIG. 19B is for example only. Different amplitude modulation designs may be employed that vary the amplitudes of trailing edge segments by different amounts in an advantageous manner so as to reduce noise.

Yet another method employed by the data-driven anti-phase rotor optimization 1825 is the frequency modulation design method 1855 whereby the segment length, which represents the wavelength or the inverse of the frequency of the trailing edge waveform, varies along the rotor radius. Table 1 shows design candidate 3D which embodies the frequency modulation design method 1855 in the varying trailing edge segment lengths of 0.2b, 0.167b, and 0.135b for the first, second, and third period from the blade root to the blade tip. FIG. 1 also shows anti-phase rotor 130 with a frequency-modulated sine wave design. FIG. 19C illustrates design candidate 3D which employs both the frequency modulation design method 1855 and the amplitude modulation design method 1850. It should be understood that FIG. 19C is for example only. Different frequency modulation designs may be employed that vary the trailing edge segment lengths by different amounts in an advantageous manner so as to reduce noise.

The present invention also teaches another anti-phase rotor design method which employs a phase shift modulation design method 1860 whereby the trailing edge waveform of the preceding blade may differ that of the following blade in the phase shift not by the exact 180° as taught by a preferred embodiment but by an arbitrary angle including the 0° phase shift angle which implies an in-phase rotor design. Table 1 shows design candidate 4D employing the phase shift modulation design method 1860 which in this case uses a 90° phase shift. FIG. 19D illustrates design candidate 4D employing a 90° phase shift modulation design method 1860. It should be understood that FIG. 19D is for example only. Different phase shift modulation designs may be employed that vary the phase shift angle along the rotor radius by a different amount in an advantageous manner so as to reduce noise.

Another anti-phase rotor design approach employs a transition modulation design method 1865 whereby the transition sharpness in the trailing edge waveform between adjacent segments is varied advantageously for noise reduction. The transition sharpness is indicated by the percentage of the transition length to the segment half length. Thus, a 0% transition implies a perfect square wave, and a 100% transition shows a gradual increase (or decrease) in the trailing edge deflection amplitude which reaches the full amplitude at the midpoint of a trailing edge segment. Table 1 shows design candidates 3B, 3C, 3D, 4E, and 4F employing various transition modulation designs as the trailing edge deflection amplitude changes from a negative to a positive value and vice versa. FIG. 19E illustrates design candidate 3C which employs a varying transition modulation design method 1865 with a segment transition of 80%, 40%, and 20% for the first, second, and third period, respectively. It should be understood that FIG. 19E is for example only. Further, design candidate 3C also employs the amplitude modulation method 1850 and the frequency modulation method 1855. Different transition modulation designs may be employed that vary the segment transition along the rotor radius by a different amount in an advantageous manner so as to reduce noise.

Table 2 shows the noise reduction of candidate anti-phase rotor designs 1900 in forward flight at 9.7 m/s:

TABLE 2

KDE Anti-Phase Rotor Design Candidates in Forward Flight Condition

| Design Candidate | Angle of Attack (°) | Thrust Change (%) | Noise Reduction (dB) |
|---|---|---|---|
| 4A | 0 | +4.5 | −2.0 |
| 4A | −1 | −0.1 | +0.6 |
| 4E | −1 | −0.2 | +1.1 |
| 4F | −1 | +0.2 | +0.2 |

Table 2 shows that design candidate 4A in forward flight condition at 0° angle of attack when the rotor plane is in a horizontal position produces +4.5% thrust which is +0.5% more than when it is in hover condition. However, the noise reduction is lost due to the incremental thrust increase. In practice, to support a forward flight condition, the rotor plane must be tilted by some non-zero angle of attack. Table 1 shows that design candidate 4A in forward flight condition at −1° angle of attack produces a small noise reduction, and that design candidate 4E produces a greater noise reduction. In practice, the angle of attack as well as the rotor speed can be determined in a trimmed forward flight condition when the drag force acting on the rotor is in balance with the forward component of the thrust while at the same time achieve the highest possible noise reduction. Thus, the present invention teaches the consideration of the angle of attack and the rotor speed as design parameters in the data-driven anti-phase rotor optimization 1825.

Figure 20A:
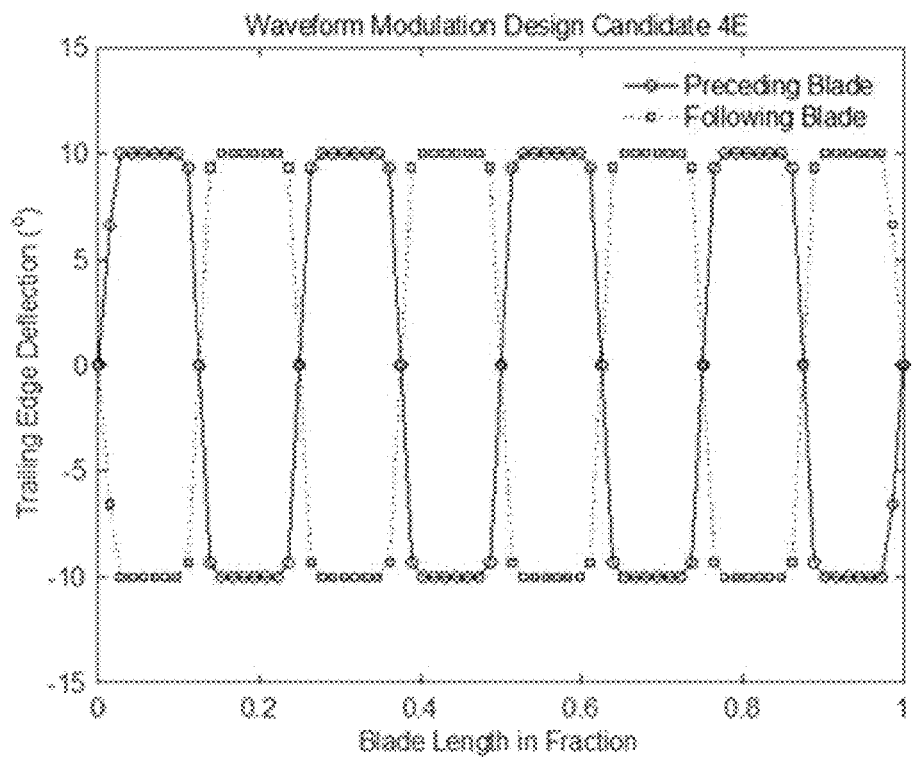
FIGS. 20A-20C are hover candidate anti-phase rotor designs 2000, according to another example embodiment.
Figure 20B:
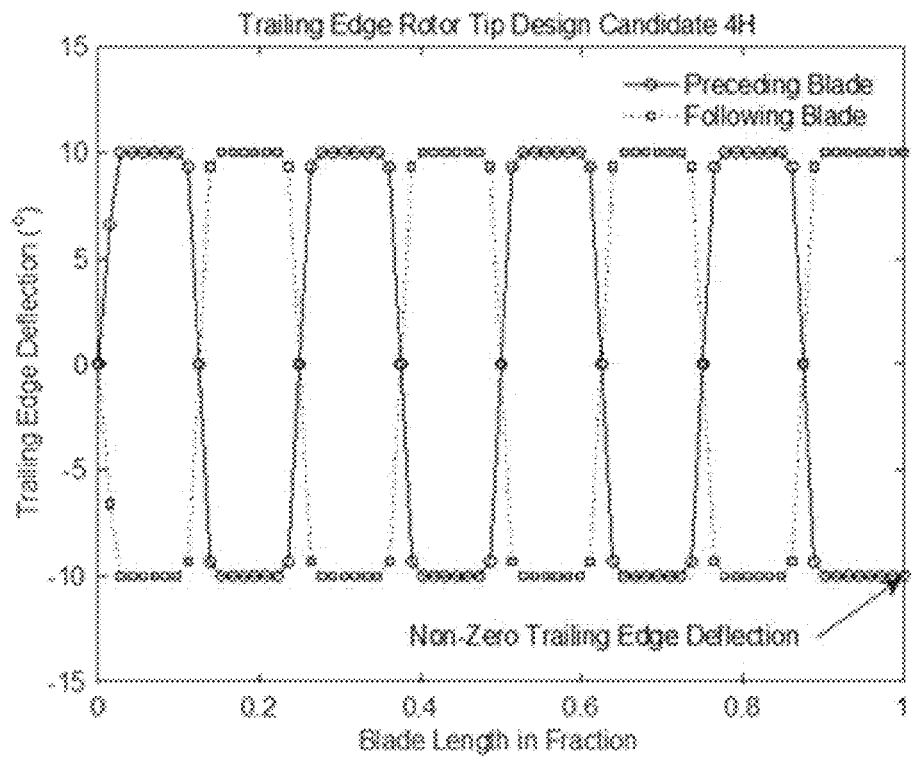
Figure 20C:
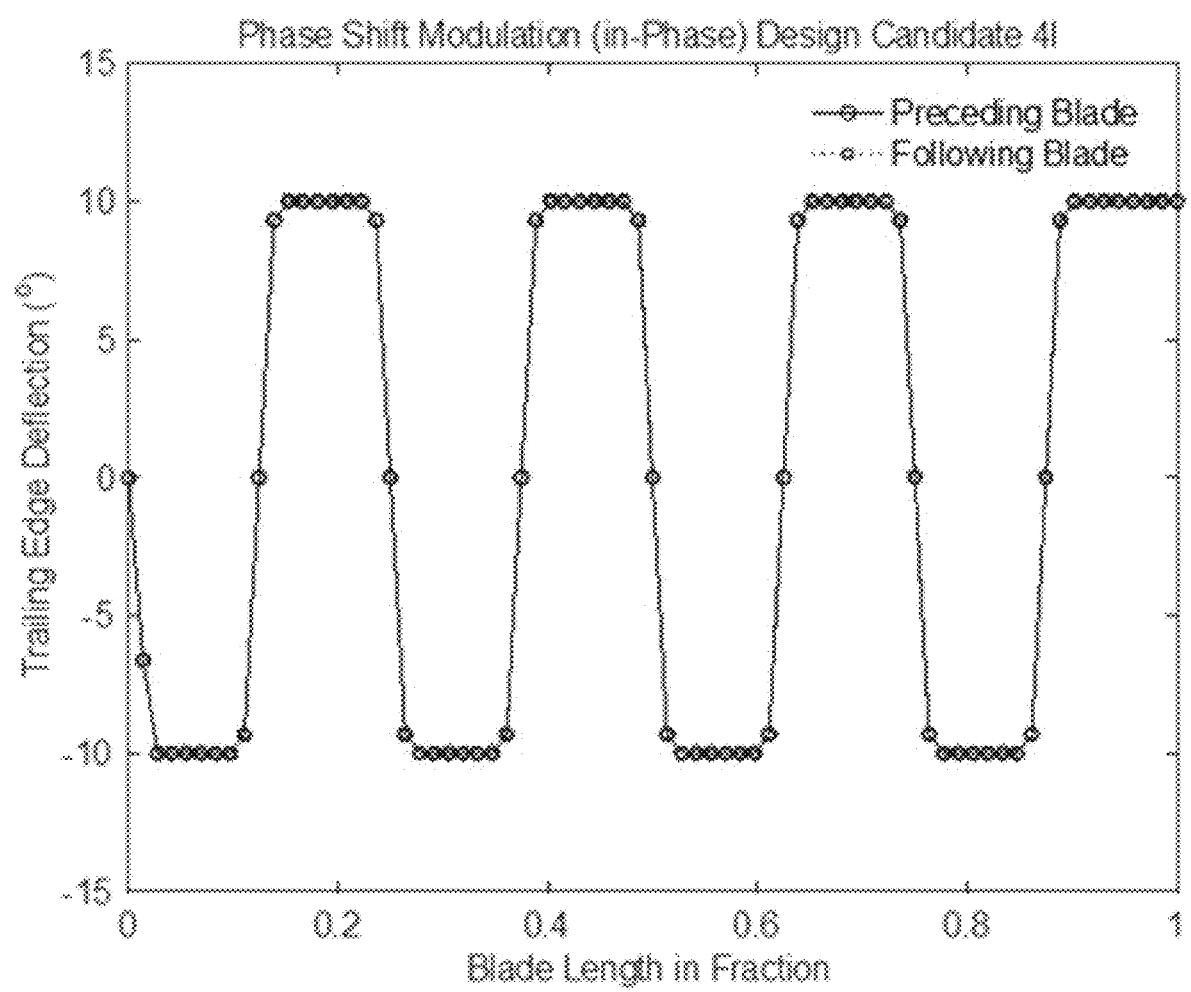

FIGS. 20A-20C are hover candidate anti-phase rotor designs 2000, according to another example embodiment. FIG. 20A, FIG. 20B, and FIG. 20C show anti-phase rotor designs 4E, 4H, and 4I, respectively, from among six candidate anti-phase rotor designs shown in Table 3:

TABLE 3

APC Anti-Phase Rotor Design Candidates in Hover Condition

| Design Candidate | Number of Periods | Segment Length Fraction η | Deflection Amplitude (°) | Tip Deflection (°) | Phase Shift (°) | Segment Transition (%) | Thrust Change (%) | Noise Reduction (dB) |
|---|---|---|---|---|---|---|---|---|
| Baseline | 0 | 1 | 0 | 0 | 0 | 0 | 0 | 0 |
| 2A | 2 | ¼ | 10 | 0 | 180 | 40 | +4.7 | +1.0 |
| 4A | 4 | ⅛ | 10 | 0 | 180 | 80 | +3.3 | +1.8 |
| 4E FIG. 20A | 4 | ⅛ | 10 | 0 | 180 | 40 | +3.7 | +2.7 |
| 4G | 4 | ⅛ | 15 | 0 | 180 | 40 | +0.5 | +2.9 |
| 4H FIG. 20B | 4 | ⅛ | 10 | 10 | 180 | 40 | +3.2 | +4.0 |
| 4I FIG. 20C | 4 | ⅛ | 10 | 10 | 0 | 40 | +3.9 | +2.5 |

As shown in Table 2, design candidates of an anti-phase rotor are selected to all have four-period trailing edge waveforms, which provides improved performance over other trailing edge waveforms for this specific rotor. The design candidates are simulated at 3200 rpm, and the computational results for these six different design candidates are shown in Table 3. These design candidates produce a slightly more noise reduction for a relatively consistent thrust level.

FIG. 20A and FIG. 20B show plots corresponding to anti-phase rotor designs 4E and 4H, respectively. Some design candidates employ trailing edge waveforms that start at the blade root and end at the blade tip at a zero trailing edge deflection, such as shown in FIGS. 19A-19E. FIG. 20A shows the trailing edge waveform of design candidate 4E which ends at the blade tip at zero trailing edge deflection. In contrast, FIG. 20B shows the trailing edge waveform of design candidate 4H which ends at the blade tip at a non-zero trailing edge deflection amplitude of −10° F. or the preceding blade and +10° F. or the following blade. This trailing edge rotor tip design produces a significant noise reduction as seen in Table 1 compared to design candidate 4E with the trailing edge waveform that ends at the blade tip at zero trailing edge deflection shown in FIG. 20A. The effectiveness of design candidate 4H is due to the positive lift created at one of the blade tips of the anti-phase rotor which generates a larger tip vortex roll-up than that if the TE deflection were to be brought to zero at the tip. At the same time, the negative lift created at the other blade tip generates a larger tip vortex roll-down than that with the zero TE deflection at the tip. The net effect is that these two tip vortices are non-planar, thereby reducing the blade vortex interaction, similar to the co-rotating tip vortices from the asymmetric tip anti-phase rotor 150 shown in FIG. 9. Design candidate 4H provides a +4.0 dB noise reduction, the largest of all these design candidates. This result, coupled with the test data for the anti-phase rotor with the asymmetric tip design 150 shown in FIG. 9, indicates that the asymmetric lift creation at the rotor blade tip provides a significant improvement in noise reduction. Thus, the present invention teaches a trailing edge rotor tip design method 1870 whereby the trailing edge deflection at the rotor tip design is an important design consideration in the data-driven anti-phase rotor optimization 1825.

Design candidate 4E may be compared to design candidate 4G which employs a larger trailing edge deflection amplitude of 15°. At this trailing edge deflection amplitude, the blade is near or in a stall state. This is evident in the reduced thrust level from that for design candidate 4E, which has a trailing edge deflection of 10°. Design candidate 4G provides a slightly improved noise reduction relative to design candidate 4E, however this may be accompanied by a blade performance in or near a stall state.

FIG. 20C shows in-phase design candidate 4I which embodies both the phase shift modulation design method and the trailing edge rotor tip design method. Anti-phase design candidate 4H may be compared to in-phase design candidate 4I which also shows a noise reduction of +2.5 dB. This noise reduction is provided solely by the alternating trailing edge waveform, which indicates the alternating trailing edge waveform is a source of noise reduction. Comparing to the anti-phase design candidate 4H, it can be seen that the additional +1.5 dB noise reduction is provided by the anti-phase trailing edge design. This further confirms the noise reduction effectiveness of the anti-phase rotor design. Furthermore, these two design candidates suggest that the alternating trailing edge waveform might provide a greater noise reduction than the anti-phase trailing edge design for this particular design and flight condition. It should be understood that the relative contributions of the noise reduction by the alternating trailing edge waveform and the anti-phase trailing edge design may be different for different rotor design applications and may depend on how various anti-phase design methods can be synergized together in a particular anti-phase rotor design.

Figure 21A:
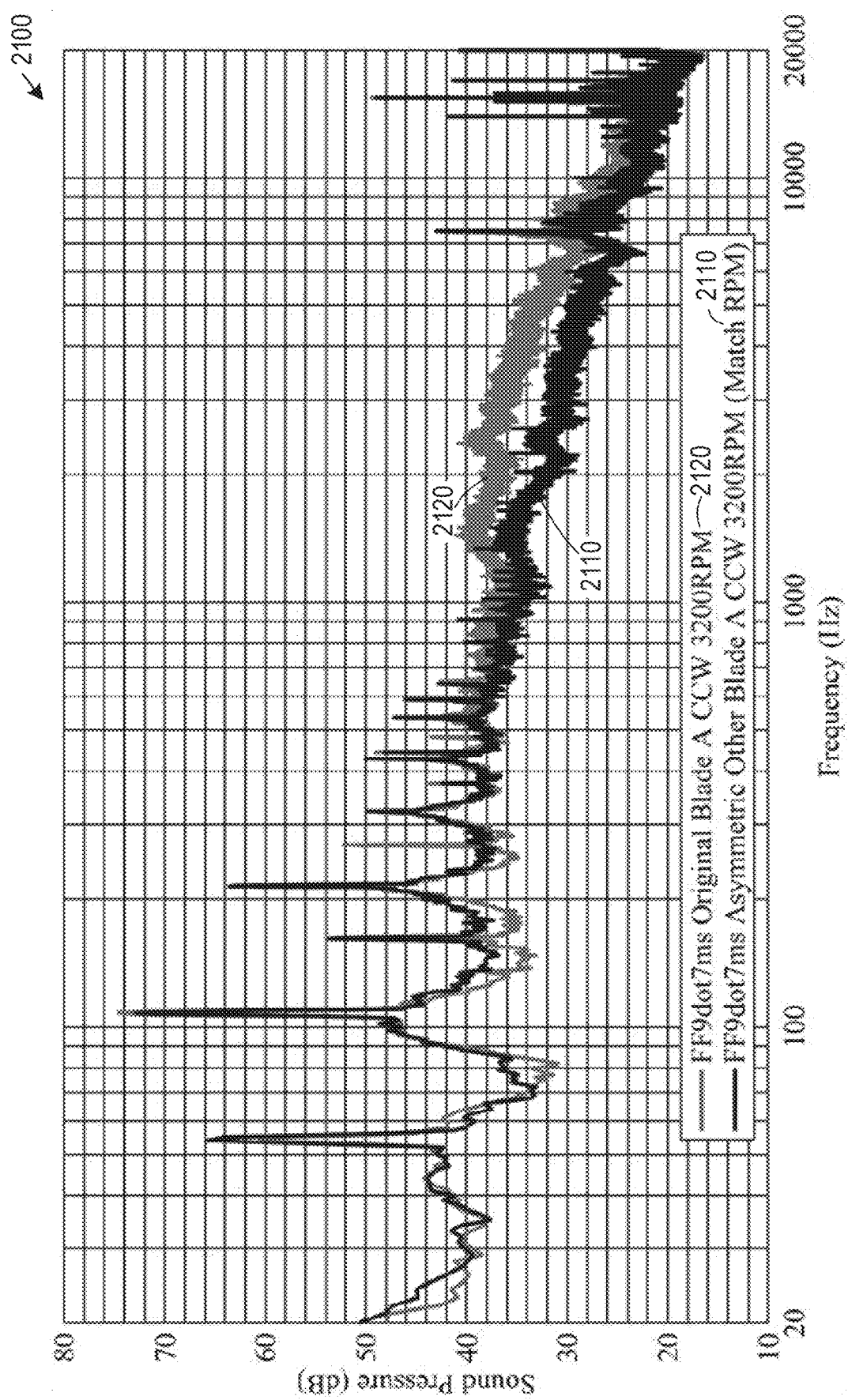
FIGS. 21A-21B are sound pressure level (SPL) spectra graphs 2100 measured by an aeroacoustic test 1830 in an anechoic chamber, according to QUART technical approach 1800.
Figure 21B:
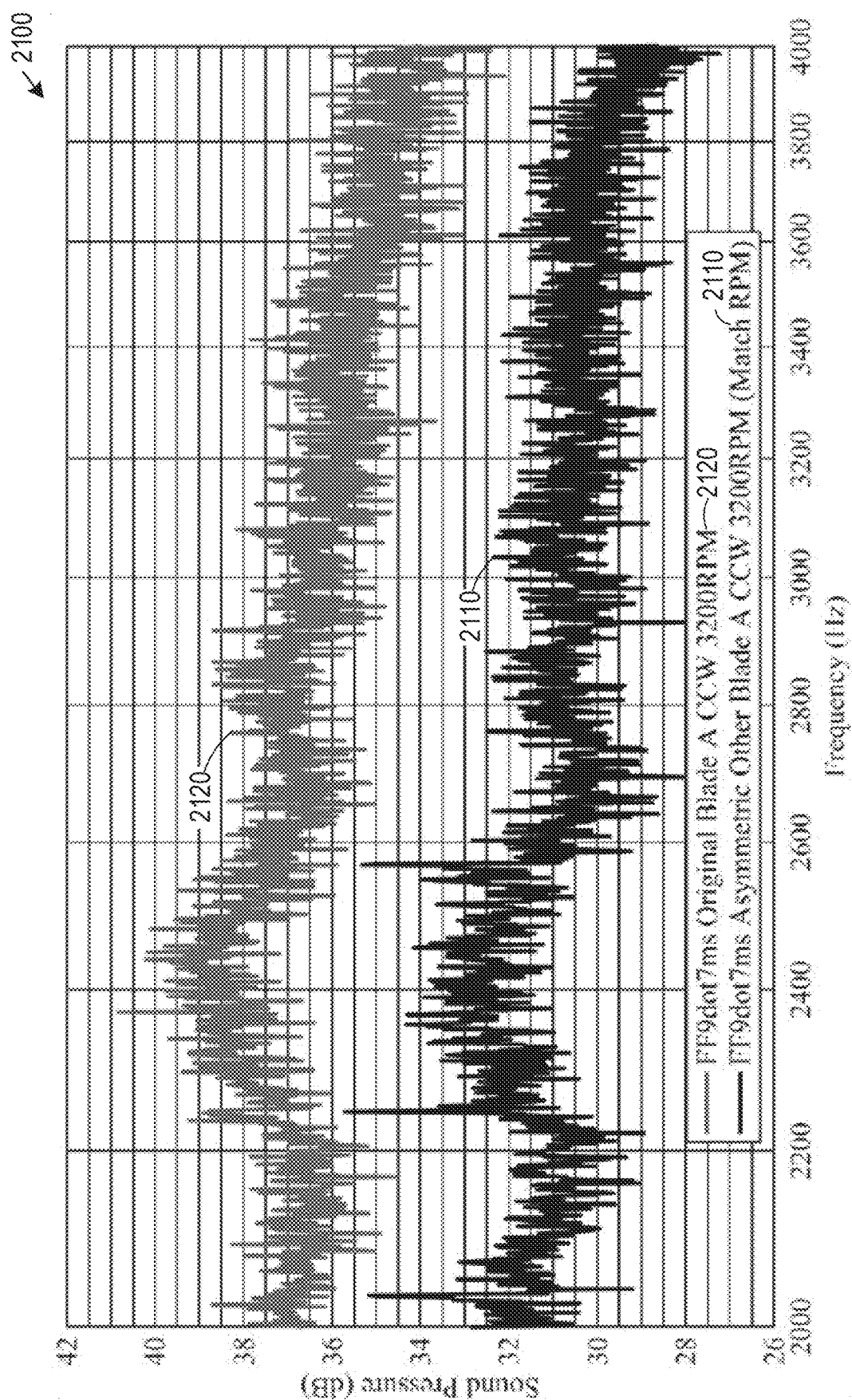

FIGS. 21A-21B are sound pressure level (SPL) spectra graphs 2100 measured by an aerocoustic test 1830 in an anechoic chamber, according to QUART technical approach 1800. Each of FIGS. 21A-21B compares a baseline conventional rotor to an anti-phase rotor employing design candidate 4H, where all the rotors are right-hand rotors in forward flight condition with matching RPM. FIG. 21A shows the broadband SPL spectra of the baseline conventional rotor 2110 and anti-phase 4H right-hand rotor 2120 in the human-audible frequency range of 20-20000 Hz. Similarly, FIG. 21B shows the narrow-band SPL spectra of baseline rotor 2110 and anti-phase 4H right-hand rotor 2120 in the frequency range of 2000-4000 Hz in which human hearing is generally most sensitive.

As shown in FIG. 21A, the spectrum graph indicates improved noise reduction of the anti-phase 4H right-hand rotor 2120 in the frequency range starting from about 700 Hz to well above 10,000 Hz. FIG. 21B shows the SPL spectrum in the frequency range of 2000-4000 Hz, which demonstrates the noise reduction of about 6 dB at about 2450 Hz. This SPL spectrum of anti-phase 4H right-hand rotor confirms the noise reduction effectiveness of the anti-phase rotor in forward flight condition with matching RPM.

Figure 22A:
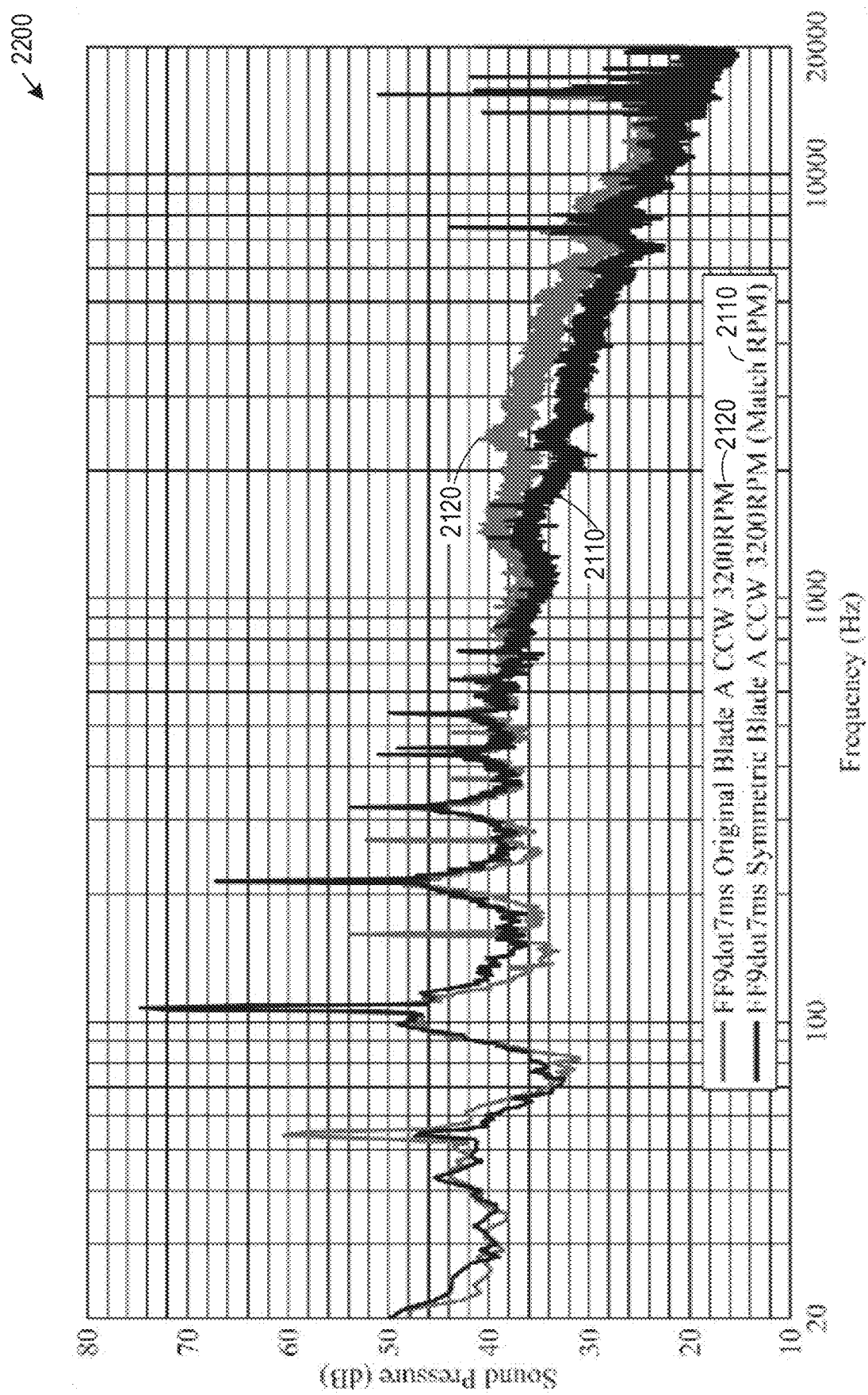
FIGS. 22A-22B are sound pressure level (SPL) spectra graphs 2200, according to an example embodiment.
Figure 22B:
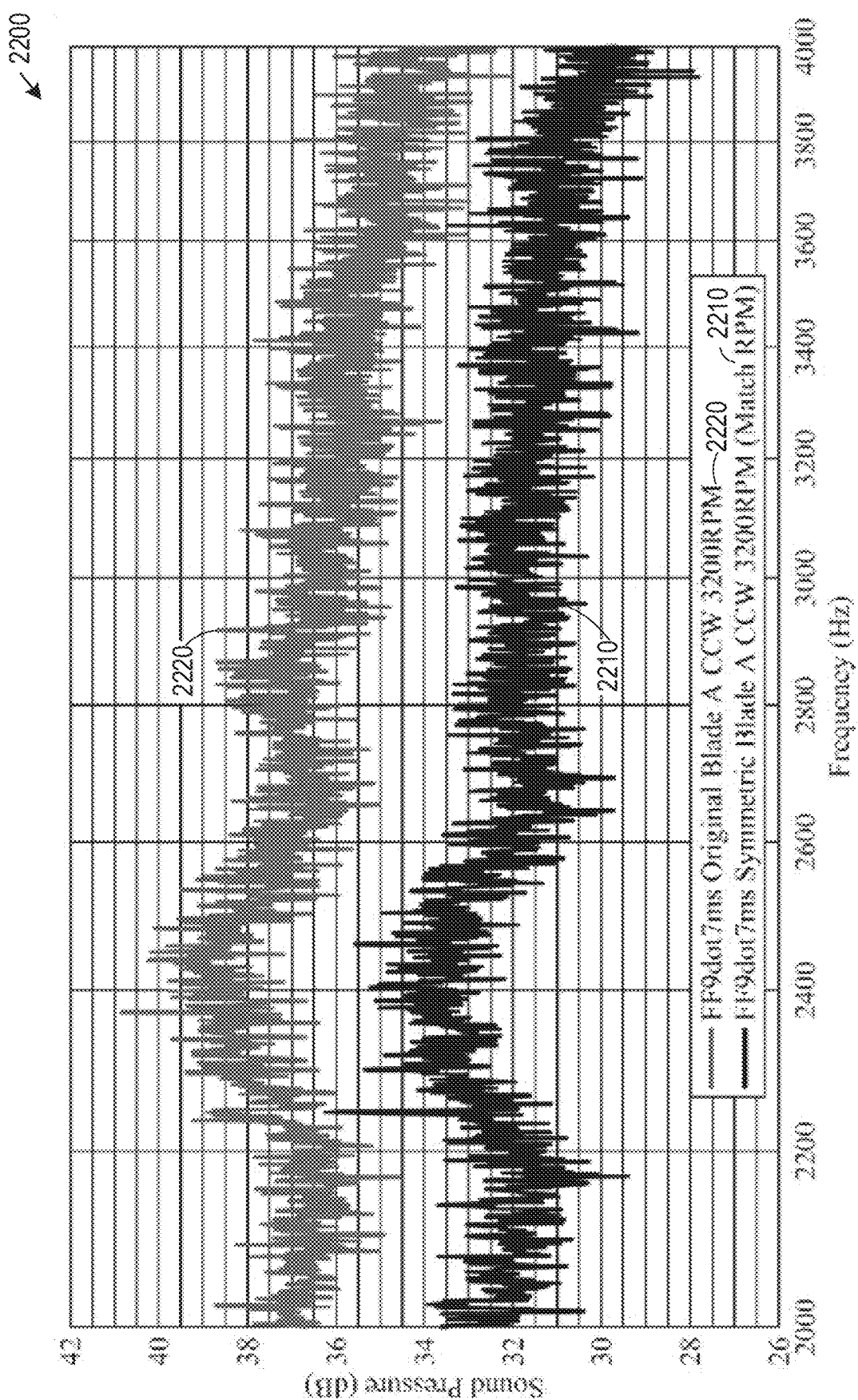

FIGS. 22A-22B are sound pressure level (SPL) spectra graphs 2200, according to an example embodiment. Each of FIGS. 22A-22B compares a baseline conventional rotor with an in-phase rotor, where all rotors are right-hand rotors in forward flight condition with matching RPM. FIG. 22A shows SPL spectra of the baseline rotor 2110 and in-phase 4H right-hand rotor 2220 in the human-audible frequency range of 20-20000 Hz. Similarly, FIG. 22B shows SPL spectra of the baseline rotor 2110 and in-phase 4H right-hand rotor 2220 in the human-sensitive frequency range of 2000-4000 Hz.

As shown in FIG. 22A, the spectrum graph indicates improved noise reduction in the frequency range of 1000-5000 Hz as compared to the baseline conventional right-hand rotor. The noise reduction is less than the noise reduction due to the anti-phase 4H right-hand rotor shown in FIG. 21A. FIG. 22B shows the noise reduction of the in-phase 4I right-hand rotor 2220 by about 5 dB at a frequency of about 2450 Hz. This indicates the in-phase 4I rotor can also achieve noise reduction, which may suggest that the alternating trailing edge waveform may contribute more to the noise reduction than the anti-phase trailing edge design. It should be understood that the acoustic data are subject to both experimental uncertainty and uncertainty in the as-built geometries of the rotors which are fabricated by 3D printing.

Figure 23:
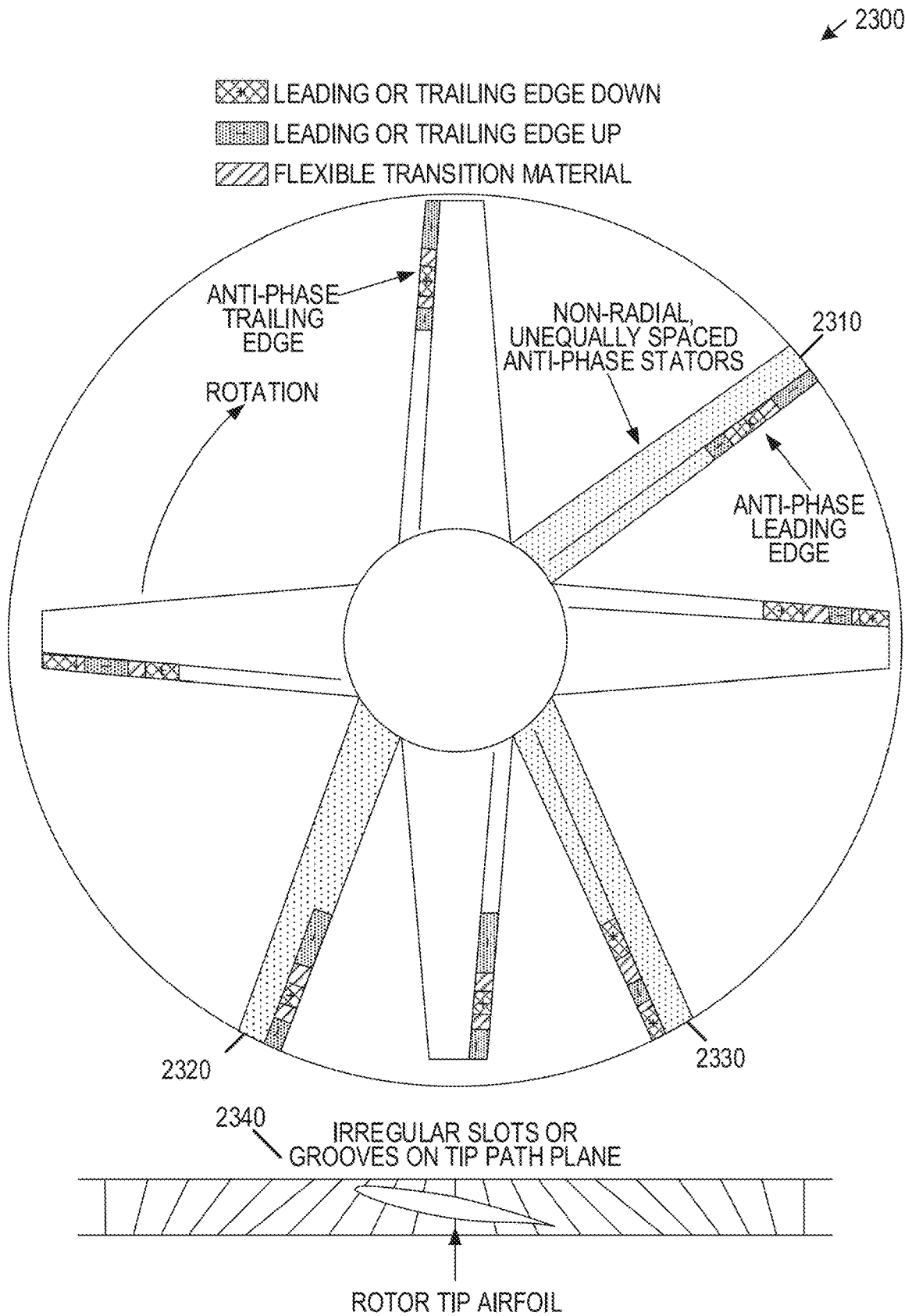
FIG. 23 shows that the dissimilar blade design can also be employed for stator support struts to break up harmonic reinforcement in a ducted rotor design, according to an example embodiment.

FIG. 23 shows that the dissimilar blade design can also be employed for stator support struts 2310-2330 to break up harmonic reinforcement in a ducted rotor design. In some embodiments, stators 2310-2330 have anti-phase trailing edge or leading edge features. In another embodiment, stators 2310-2330 are configured in a non-radial, unequally spaced arrangement. In yet another embodiment, the rotor tip path duct area has slots or grooves 2340 designed to break up the blade tip vortex structures to reduce noise and vibration.

Figure 24:
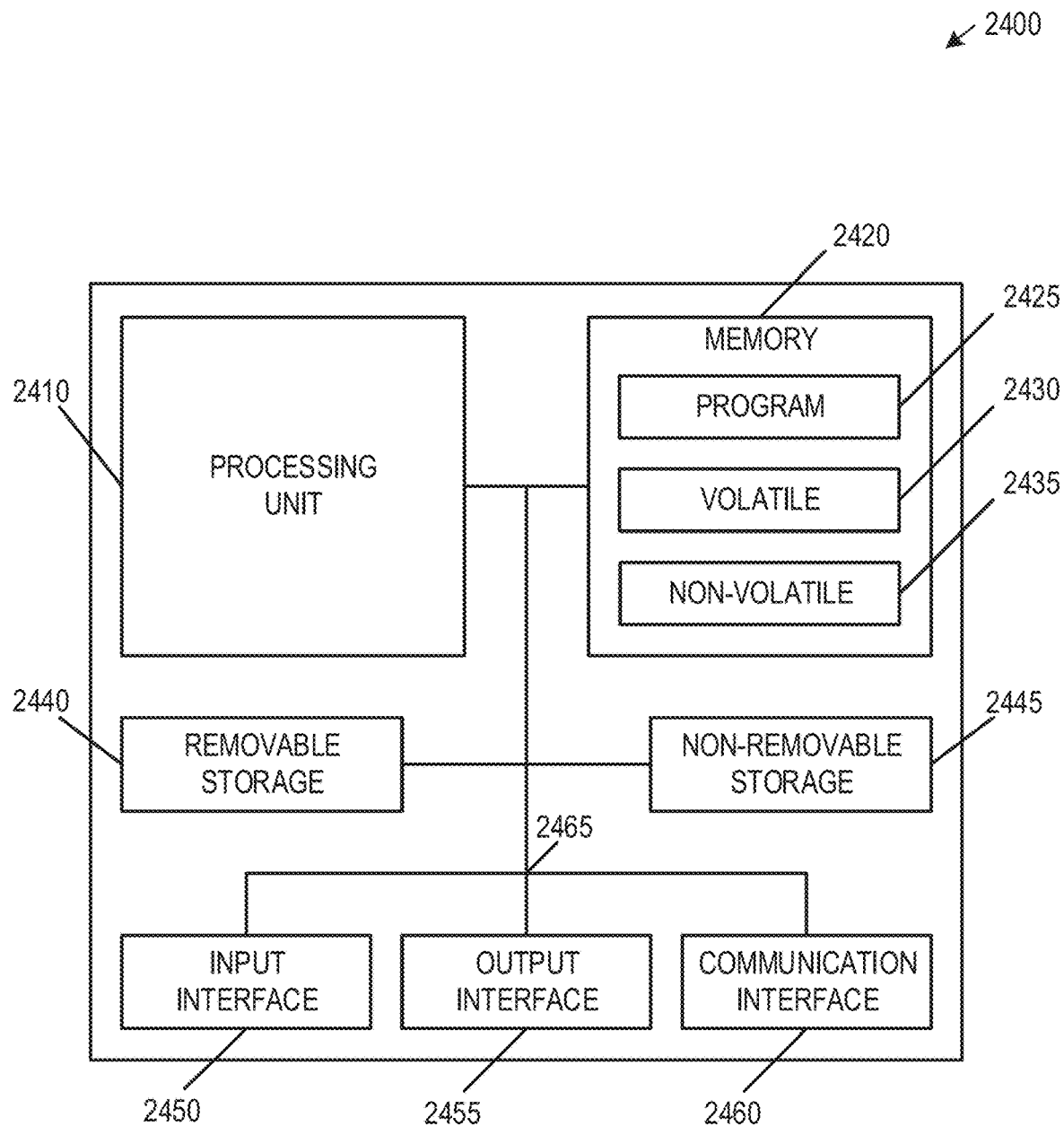
FIG. 24 is a block schematic diagram of a computer system 2400 to perform noise reduction systems or methods described herein.

FIG. 24 is a block schematic diagram of a computer system 2400 to perform noise reduction systems or methods described herein. These reduction systems or methods may include active management of an anti-phase active rotor airfoil reconfiguration, rotor clocking, articulation of multi-axis 6-DOF rotors in conjunction with a flight control system onboard an aircraft to direct noise source away from noise-sensitive targets, or other noise reduction systems or methods described herein. All components need not be used in various embodiments. One example computing device in the form of a computer system 2400 may include a processing unit 2410, memory 2420, removable storage 2440, and non-removable storage 2445. Although the example computing device is illustrated and described as computer system 2400, the computing device is in different forms in different embodiments. For example, the computing device may instead be a smartphone, a tablet, smartwatch, smart storage device (SSD), or other computing device including the same or similar elements as illustrated and described with regard to FIG. 24. Devices, such as smartphones, tablets, and smartwatches, are collectively referred to as mobile devices or user equipment.

Although the various data storage elements are illustrated as part of the computer system 2400, the storage may also or alternatively include cloud-based storage accessible via a network, such as the internet or server-based storage. Note also that an SSD may include a processor on which the parser is run, allowing transfer of parsed, filtered data through I/O channels between the SSD and main memory.

Memory 2420 may include volatile memory 2430 and non-volatile memory 2435. Computer system 2400 may include or have access to a computing environment that includes a variety of computer-readable media, such as volatile memory 2430 and non-volatile memory 2435, removable storage 2440 and non-removable storage 2445. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer system 2400 may include or have access to a computing environment that includes input interface 2450, output interface 2455, and a communication interface 2460. Output interface 2455 may include a display device, such as a touchscreen, that also may serve as an input device. The input interface 2450 may include one or more of a touchscreen, touchpad, mouse, keyboard, camera, one or more device-specific buttons, one or more sensors integrated within or coupled via wired or wireless data connections to the computer system 2400, and other input devices. The computer may operate in a networked environment using a communication connection to connect to one or more remote computers, such as database servers. The remote computer may include a personal computer (PC), server, router, network PC, a peer device, or other common data flow network switch, or the like. The communication connection may include a Local Area Network (LAN), a Wide Area Network (WAN), cellular, Wi-Fi, Bluetooth, or other networks. According to one embodiment, the various components of computer system 2400 are connected with a system bus 2465.

Computer-readable instructions stored on a computer-readable medium are executable by the processing unit 2410 of the computer system 2400, such as a program 2425 stored in memory 2420. The program 2425 in some embodiments comprises software to implement one or more method described herein. A hard drive, CD-ROM, and RAM are some examples of articles including a non-transitory computer-readable medium such as a storage device. The terms computer-readable medium and storage device do not include carrier waves to the extent carrier waves are deemed transitory. Storage can also include networked storage, such as a storage area network (SAN). Computer program 2425 along with a workspace manager may be used to cause processing unit 2410 to perform one or more methods or algorithms described herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed or manufactured by fabrication methods, permanently configured (e.g., hardwired) or temporarily configured (e.g., programmed) to operate in a certain manner and/or to perform certain operations described herein such as an active anti-phase rotor device with mini-trailing edge flaps. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may access the memory device later to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least one or more processors or processor-implemented modules may perform some of the operations of a method. The performance of certain of the operations may be distributed among the one or more processors, not only residing within a single machine, but also deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Example embodiments may be implemented in digital electronic circuitry, in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. FIG. 23 depicts an example hardware (e.g., machine) and software architectures that may be deployed, in various example embodiments.

Example 1 is a noise-reducing rotor device comprising: a first airfoil defining a first aerodynamic profile and having a first length relative to a rotor hub, the first airfoil comprising a first anti-phase structure, the first anti-phase structure including upward or downward deflecting portions; and a second airfoil defining a second aerodynamic profile and having a second length relative to the rotor hub, the second airfoil comprising a second anti-phase structure, the second anti-phase structure including upward or downward deflection portions, the second anti-phase structure different from the first anti-phase structure.

In Example 2, the subject matter of Example 1 includes, wherein: the first anti-phase structure includes a first trailing edge structure provided on a trailing edge of the first airfoil, the first trailing edge structure including at least both upward and downward deflecting portions, the respective portions arranged alternately along the first trailing edge of the first airfoil; and the second anti-phase structure includes a second trailing edge structure provided on a trailing edge of the second airfoil, the second trailing edge structure including at least both upward and downward deflecting portions, the respective portions arranged alternately along the second trailing edge of the second airfoil.

In Example 3, the subject matter of Examples 1-2 includes, wherein: the first anti-phase structure includes a first leading edge structure provided on a leading edge of the first airfoil; and the second anti-phase structure includes a second leading edge structure provided on a leading edge of the second airfoil.

In Example 4, the subject matter of Examples 1-3 includes, wherein: the first anti-phase structure includes a first asymmetric wingtip structure; and the second anti-phase structure includes a second asymmetric wingtip structure.

In Example 5, the subject matter of Example 4 includes, wherein the first asymmetric wingtip structure is inverted relative to the second asymmetric wingtip structure.

In Example 6, the subject matter of Examples 1-5 includes, wherein the upward or downward deflecting portions extend in a spanwise direction that respectively deflect a chord line upward or downward relative to a neutral chord line.

In Example 7, the subject matter of Examples 1-6 includes, wherein the upward or downward deflecting portions follow a waveform defined by at least one of a waveform shape, a number of periods, a varying amplitude, and a varying frequency for each period.

In Example 8, the subject matter of Examples 1-7 includes, wherein the upward or downward deflecting portions on the second airfoil are in an anti-phase fashion defined relative to the respective downward or upward deflecting portions on the first airfoil by a phase shift angle, wherein: the phase shift angle is based on 360 degrees divided by a number of airfoils multiplied a positive phase shift integer; and the phase shift angle is less than or equal to 180 degrees.

In Example 9, the subject matter of Examples 1-8 includes, wherein a respective spanwise length of upward or downward deflecting portions are different between the two airfoils.

In Example 10, the subject matter of Example 9 includes, wherein the respective spanwise lengths of upward or downward deflecting portions are irregular.

In Example 11, the subject matter of Examples 9-10 includes, wherein the respective spanwise lengths of upward or downward deflecting portions are defined by a non-zero phase shift angle between the two airfoils.

In Example 12, the subject matter of Examples 1-11 includes, wherein the first anti-phase structure includes at least one portion deflecting upward and at least one portion deflecting downward.

In Example 13, the subject matter of Examples 1-12 includes, wherein the respective upward or downward deflecting portions of the two airfoils are inverted relative to each other.

In Example 14, the subject matter of Examples 1-13 includes, wherein the upward or downward deflecting portions are adjustable.

In Example 15, the subject matter of Examples 1-14 includes, wherein one or more of the upward or downward deflecting portions are actuated structures.

In Example 16, the subject matter of Examples 1-15 includes, wherein the actuated structures include a plurality of actuated anti-phase mini-flaps disposed between pairs of continuous trailing edge structures.

In Example 17, the subject matter of Examples 1-16 includes, wherein the actuated structures include a flexible continuous trailing edge supported internally by a plurality of actuated mini-flap ribs.

In Example 18, the subject matter of Examples 1-17 includes, wherein the first and second lengths are the same.

In Example 19, the subject matter of Examples 1-18 includes, wherein: the first and second lengths different; and the first and second airfoils are located at opposition positions about the rotor hub.

In Example 20, the subject matter of Examples 1-19 includes, wherein the first and second airfoils include distal tip regions defining an asymmetric profile with respect to each other.

Example 21 is a noise-reducing rotor method comprising: rotating a first airfoil and a second airfoil operatively connected to a rotor hub; wherein: the first airfoil defines a first aerodynamic profile and having a first length relative to a hub, the first airfoil comprising a first anti-phase structure, the first anti-phase structure including respective upward or downward deflecting portions; and the second airfoil defines a second aerodynamic profile and having a second length relative to the hub, the second airfoil comprising a second anti-phase structure, the second anti-phase structure different from the first anti-phase structure.

In Example 22, the subject matter of Example 21 includes, wherein the first anti-phase structure includes a first trailing edge structure; and the second anti-phase structure includes a second trailing edge structure.

In Example 23, the subject matter of Examples 21-22 includes, wherein the first anti-phase structure includes a first leading edge structure; and the second anti-phase structure includes a second leading edge structure.

In Example 24, the subject matter of Examples 21-23 includes, wherein the first anti-phase structure includes a first asymmetric wingtip structure; and the second anti-phase structure includes a second asymmetric wingtip structure.

In Example 25, the subject matter of Example 24 includes, wherein the first asymmetric wingtip structure is inverted relative to the second asymmetric wingtip structure.

In Example 26, the subject matter of Examples 21-25 includes, wherein the upward or downward deflecting portions extend in a spanwise direction that respectively deflect a chord line upward or downward relative to a neutral chord line.

In Example 27, the subject matter of Examples 21-26 includes, wherein the upward or downward deflecting portions follow a waveform defined by at least one of a waveform shape, a number of periods, a varying amplitude, and a varying frequency for each period.

In Example 28, the subject matter of Examples 21-27 includes, wherein the upward or downward deflecting portions on the second airfoil are in an anti-phase fashion defined relative to the respective downward or upward deflecting portions on the first airfoil by a phase shift angle, wherein: the phase shift angle is based on 360 degrees divided by a number of airfoils multiplied a positive phase shift integer; and the phase shift angle is less than or equal to 180 degrees.

In Example 29, the subject matter of Examples 21-28 includes, wherein a respective spanwise length of upward or downward deflecting portions are different between the two airfoils.

In Example 30, the subject matter of Example 29 includes, wherein the respective spanwise lengths of upward or downward deflecting portions are irregular.

In Example 31, the subject matter of Examples 29-30 includes, wherein the respective spanwise lengths of upward or downward deflecting portions are defined by a non-zero phase shift angle between the two airfoils.

In Example 32, the subject matter of Examples 21-31 includes, wherein the first anti-phase structure includes at least one portion deflecting upward and at least one portion deflecting downward.

In Example 33, the subject matter of Examples 21-32 includes, wherein the respective upward or downward deflecting portions of the two airfoils are inverted relative to each other.

In Example 34, the subject matter of Examples 21-33 includes, wherein one or more of the upward or downward deflecting portions are actuated structures.

In Example 35, the subject matter of Example 34 includes, wherein the actuated structures include a plurality of actuated anti-phase mini-flaps disposed between pairs of continuous trailing edge structures.

In Example 36, the subject matter of Examples 34-35 includes, wherein the actuated structures include a flexible continuous trailing edge supported internally by a plurality of actuated mini-flap ribs.

In Example 37, the subject matter of Examples 21-36 includes, wherein the first and second lengths are the same.

In Example 38, the subject matter of Examples 21-37 includes, wherein: the first and second lengths different; and the first and second airfoils are located at opposition positions about the hub.

In Example 39, the subject matter of Examples 21-38 includes, wherein the first and second airfoils include distal tip regions defining an asymmetric profile with respect to each other.

Example 40 is one or more machine-readable medium including instructions, which when executed by a computing system, cause the computing system to perform any of the methods of Examples 21-39.

Example 41 is an apparatus comprising means for performing any of the methods of Examples 21-39.

Example 42 is a propulsion rotor device comprising: a first rotor blade having a first aerodynamic profile; and a second rotor blade having a second aerodynamic profile, the second aerodynamic profile including an anti-phase structure that is non-planar with the first aerodynamic profile, the anti-phase structure to oppose harmonic reinforcement of the first aerodynamic profile.

In Example 43, the subject matter of Example 42 includes, wherein the anti-phase structure includes an anti-phase trailing edge on the second rotor blade.

In Example 44, the subject matter of Example 43 includes, wherein the anti-phase trailing edge includes an actuated trailing edge structure.

In Example 45, the subject matter of Examples 43-44 includes, wherein the actuated trailing edge structure includes a plurality of actuated anti-phase mini-flaps disposed between pairs of continuous trailing edge structures.

In Example 46, the subject matter of Examples 43-45 includes, wherein the actuated trailing edge structure includes a flexible continuous trailing edge supported internally by a plurality of actuated mini-flap ribs.

In Example 47, the subject matter of Examples 42-46 includes, wherein the anti-phase structure includes an asymmetric wingtip on the second rotor blade.

In Example 48, the subject matter of Examples 42-47 includes, wherein the anti-phase structure includes an unequal blade length.

In Example 49, the subject matter of Examples 42-48 includes, wherein: the first rotor blade and second rotor blade include ducted rotor blades; and the anti-phase structure includes non-radial unequally spaced stators.

In Example 50, the subject matter of Examples 42-49 includes, an aerodynamic duct surrounding the first rotor blade and the second rotor blade, wherein the aerodynamic duct includes an anti-phase duct structure to oppose harmonic reinforcement of the first aerodynamic profile and the second aerodynamic profile.

In Example 51, the subject matter of Example 50 includes, wherein the anti-phase duct structure includes a stationary vane to oppose harmonic reinforcement between the first rotor blade and the second rotor blade.

In Example 52, the subject matter of Examples 50-51 includes, wherein the anti-phase duct structure includes a stationary stator to oppose harmonic reinforcement between the first rotor blade and the second rotor blade.

Example 53 is a propulsion rotor method comprising: rotating a first rotor blade and a second rotor blade operatively connected to a first rotor hub; wherein: the first rotor blade includes, a first aerodynamic profile; and the second rotor blade includes a second aerodynamic profile, the second aerodynamic profile including an anti-phase structure that is non-planar with the first aerodynamic profile, the anti-phase structure to oppose harmonic reinforcement of the first aerodynamic profile.

In Example 54, the subject matter of Example 53 includes, wherein the anti-phase structure includes an anti-phase trailing edge on the second rotor blade.

In Example 55, the subject matter of Example 54 includes, wherein the anti-phase trailing edge includes an actuated trailing edge structure.

In Example 56, the subject matter of Examples 54-55 includes, wherein the actuated trailing edge structure includes a plurality of actuated anti-phase mini-flaps disposed between pairs of continuous trailing edge structures.

In Example 57, the subject matter of Examples 54-56 includes, wherein the actuated trailing edge structure includes a flexible continuous trailing edge supported internally by a plurality of actuated mini-flap ribs.

In Example 58, the subject matter of Examples 53-57 includes, wherein the anti-phase structure includes an asymmetric wingtip on the second rotor blade.

In Example 59, the subject matter of Examples 53-58 includes, wherein the anti-phase structure includes an unequal blade length.

In Example 60, the subject matter of Examples 53-59 includes, wherein: the first rotor blade and second rotor blade include ducted rotor blades; and the anti-phase structure includes non-radial unequally spaced stators.

In Example 61, the subject matter of Examples 53-60 includes, rotating a first rotor blade and a second rotor blade within an aerodynamic duct surrounding the first rotor blade and the second rotor blade, wherein the aerodynamic duct includes an anti-phase duct structure to oppose harmonic reinforcement of the first aerodynamic profile and the second aerodynamic profile.

In Example 62, the subject matter of Example 61 includes, wherein the anti-phase duct structure includes a stationary vane to oppose harmonic reinforcement between the first rotor blade and the second rotor blade.

In Example 63, the subject matter of Examples 61-62 includes, wherein the anti-phase duct structure includes a stationary stator to oppose harmonic reinforcement between the first rotor blade and the second rotor blade.

Example 64 is one or more machine-readable medium including instructions, which when executed by a computing system, cause the computing system to perform any of the methods of Examples 53-63.

Example 65 is an apparatus comprising means for performing any of the methods of Examples 53-63.

Example 66 is a noise-reducing rotor device comprising: a first airfoil defining a first aerodynamic profile and having a first length relative to a rotor hub, the first airfoil comprising a first trailing edge configuration, the first trailing edge configuration or the first leading edge configuration or a combination thereof including respective upward or downward deflecting portions; and a second airfoil defining a second aerodynamic profile and having a second length relative to the rotor hub, the second airfoil comprising a second trailing edge configuration or a second leading edge configuration or a combination thereof, the second trailing edge configuration or the second leading edge configuration or the combination thereof different respectively from the first trailing edge configuration or the first leading edge configuration or the combination thereof in the physical characteristics including the phase angle, shape, and amplitude of the trailing edge deflection.

In Example 67, the subject matter of Example 66 includes, wherein a trailing edge of a first airfoil alternatively is replaced by a leading edge of a first airfoil and a trailing edge of the second airfoil alternatively is replaced by a leading edge of a second airfoil.

In Example 68, the subject matter of Examples 66-67 includes, wherein a leading edge configuration of a first airfoil different from a leading edge configuration of a second airfoil in the physical characteristics including the phase angle, shape, amplitude of the leading edge deflection, and other pertinent parameters.

In Example 69, the subject matter of Examples 66-68 includes, wherein the first leading edge configuration includes at least one portion deflecting upward and at least one portion deflecting downward.

In Example 70, the subject matter of Examples 66-69 includes, wherein the first and second airfoils include distal tip regions defining an asymmetric profile with respect to each other.

In Example 71, the subject matter of Example 70 includes, wherein the airfoils in the distal tip regions is inverted relative to each other.

In Example 72, the subject matter of Examples 70-71 includes, wherein the first and second airfoils include distal tip regions defining a symmetric profile with respect to each other.

In Example 73, the subject matter of Examples 66-72 includes, wherein the anti-phase structure includes anti-phase leading edge on the proximate blade defined by a phase shift angle relative to the preceding blade equal to 360 degrees divided by the number of blades multiplied by an integer such that the phase shift angle is less than or equal to 180 degrees.

In Example 74, the subject matter of Example 73 includes, wherein the anti-phase leading edge includes an actuated leading edge structure.

In Example 75, the subject matter of Example 74 includes, wherein the actuated leading edge structure includes a plurality of actuated anti-phase mini-slats disposed between pairs of continuous leading edge structures.

In Example 76, the subject matter of Examples 74-75 includes, wherein the actuated leading edge structure includes a flexible continuous leading edge supported internally by a plurality of actuated mini-flap ribs.

In Example 77, the subject matter of Examples 66-76 includes, wherein the asymmetric tip on the second rotor blade includes an inverted airfoil.

In Example 78, the subject matter of Example 77 includes, optionally including four airfoils, wherein the asymmetric tip on the third rotor blade includes an inverted airfoil.

In Example 79, the subject matter of Examples 77-78 includes, wherein the anti-phase structure includes a symmetric tip on the proximate rotor blade having the same angle as the angle of the tip of the preceding blade and an anti-phase trailing edge defined by a phase shift angle relative to the trailing edge of the tip on the preceding rotor blade equal to 360 degrees divided by the number of blades multiplied by a positive integer such that the phase shift angle is less than or equal to 180 degrees.

Example 80 is a noise-reducing rotor method comprising: rotating a first airfoil and a second airfoil operatively connected to a rotor hub; wherein: the first airfoil defines a first aerodynamic profile and having a first length relative to a hub, the first airfoil comprising a first trailing edge configuration or a first leading edge configuration or a combination thereof, the first trailing edge configuration or the first leading edge configuration or the combination thereof including respective upward or downward deflecting portions; and the second airfoil defines a second aerodynamic profile and having a second length relative to the hub, the second airfoil comprising a second trailing edge configuration or a second leading edge configuration or a combination thereof, the second trailing edge configuration or the second leading edge configuration or the combination thereof different respectively from the first trailing edge configuration in the physical characteristics including the phase angle, shape, and amplitude of the trailing edge deflection.

In Example 81, the subject matter of Example 80 includes, wherein a trailing edge of a first airfoil alternatively is replaced by a leading edge of a first airfoil and a trailing edge of the second airfoil alternatively is replaced by a leading edge of a second airfoil.

In Example 82, the subject matter of Examples 80-81 includes, wherein a leading edge configuration of a first airfoil different from a leading edge configuration of a second airfoil in the physical characteristics including the phase angle, shape, amplitude of the leading edge deflection, and other pertinent parameters.

In Example 83, the subject matter of Examples 80-82 includes, wherein the first leading edge configuration includes at least one portion extending upward and at least one portion extending downward.

In Example 84, the subject matter of Examples 80-83 includes, wherein the first and second airfoils include distal tip regions defining an asymmetric profile with respect to each other.

In Example 85, the subject matter of Example 84 includes, wherein the airfoils in the distal tip regions is inverted relative to each other.

In Example 86, the subject matter of Examples 84-85 includes, wherein the first and second airfoils include distal tip regions defining a symmetric profile with respect to each other.

In Example 87, the subject matter of Examples 80-86 includes, wherein the anti-phase structure includes an anti-phase leading edge on the proximate rotor blade defined by a phase shift angle relative to the preceding blade equal to 360 degrees divided by the number of blades multiplied by a positive integer such that the phase shift angle is less than or equal to 180 degrees.

In Example 88, the subject matter of Examples 80-87 includes, wherein the anti-phase leading edge includes an actuated leading edge structure.

In Example 89, the subject matter of Examples 80-88 includes, wherein the actuated leading edge structure includes a flexible continuous leading edge supported internally by a plurality of actuated mini-flap ribs.

In Example 90, the subject matter of Examples 80-89 includes, wherein the asymmetric tip on the second rotor blade includes an inverted airfoil.

In Example 91, the subject matter of Examples 80-90 includes, wherein the anti-phase structure includes a symmetric tip on the proximate rotor blade having the same angle as the angle of the tip of the preceding blade and an anti-phase trailing edge defined by a phase shift angle relative to the trailing edge of the tip on the preceding rotor blade equal to 360 degrees divided by the number of blades multiplied by a positive integer such that the phase shift angle is less than or equal to 180 degrees.

Example 92 is at least one machine-readable medium including instructions that, when executed by processing circuitry, cause the processing circuitry to perform operations to implement of any of Examples 1-91.

Example 93 is an apparatus comprising means to implement of any of Examples 1-91.

Example 94 is a system to implement of any of Examples 1-91.

Example 95 is a method to implement of any of Examples 1-91.

Although an embodiment has been described with reference to specific example embodiments, it will be evident that various modifications and changes may be made to these embodiments without departing from the broader spirit and scope of the subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually or collectively, by the term "subject matter" merely for convenience and without intending to limit the scope of this application voluntarily to any single subject matter or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A noise-reducing rotor device comprising:
a first airfoil defining a first aerodynamic profile and having a first length relative to a rotor hub, the first airfoil comprising a first anti-phase structure, the first anti-phase structure including upward and downward deflecting portions; and
a second airfoil defining a second aerodynamic profile and having a second length relative to the rotor hub, the second airfoil comprising a second anti-phase structure, the second anti-phase structure including upward and downward deflection portions, the second anti-phase structure different from the first anti-phase structure,
wherein at least one portion of the upward deflecting portions of the first airfoil is aligned to span a same radius as at least one portion of the downward deflecting portions of the second airfoil.

2. The device of claim 1, wherein:
the first anti-phase structure includes a first trailing edge structure provided on a trailing edge of the first airfoil, the first trailing edge structure including at least both upward and downward deflecting portions, the respective portions arranged alternately along the first trailing edge of the first airfoil; and
the second anti-phase structure includes a second trailing edge structure provided on a trailing edge of the second airfoil, the second trailing edge structure including at least both upward and downward deflecting portions, the respective portions arranged alternately along the second trailing edge of the second airfoil.

3. The device of claim 1, wherein:
the first anti-phase structure includes a first leading edge structure provided on a leading edge of the first airfoil; and
the second anti-phase structure includes a second leading edge structure provided on a leading edge of the second airfoil.

4. The device of claim 1, wherein:
the first anti-phase structure includes a first tip structure; and
the second anti-phase structure includes a second tip structure, wherein the first tip structure is rotationally asymmetric to the second tip structure as the rotor device is rotated about a rotational axis of the rotor hub.

5. The device of claim 4, wherein the first tip structure is curved from a main blade surface of the first airfoil, the second tip structure is curved from a main blade surface of the second airfoil, and the curvature of the first tip structure is diametrically opposite to the curvature of the second tip structure as arranged on the rotor device.

6. The device of claim 1, wherein the upward or downward deflecting portions extend in a spanwise direction that respectively deflect a chord line upward or downward relative to a neutral chord line.

7. The device of claim 1, wherein the upward or downward deflecting portions follow a waveform defined by at least one of a waveform shape, a number of periods, a varying amplitude, and a varying frequency for each period.

8. The device of claim 1, wherein the upward or downward deflecting portions on the second airfoil are in an anti-phase fashion defined relative to the respective downward or upward deflecting portions on the first airfoil by a phase shift angle.

9. The device of claim 8, wherein:
the phase shift angle is based on 360 degrees divided by a number of airfoils multiplied a positive phase shift integer; and
the phase shift angle is less than or equal to 180 degrees.

10. The device of claim 1, wherein a respective spanwise length of the upward or downward deflecting portions are different between the two airfoils.

11. The device of claim 10, wherein the respective spanwise lengths of the upward or downward deflecting portions are irregular.

12. The device of claim 10, wherein the respective spanwise lengths of the upward or downward deflecting portions are defined by a non-zero phase shift angle between the two airfoils.

13. The device of claim 1, wherein the first anti-phase structure includes at least one portion deflecting upward and at least one portion deflecting downward.

14. The device of claim 1, wherein at least one of the upward deflecting portions of the first airfoil spans a same radius as at least one of the downward deflecting portions of the second airfoil.

15. The device of claim 1, wherein one or more of the upward or downward deflecting portions are actuated structures.

16. The device of claim 15, wherein the actuated structures include a plurality of actuated anti-phase mini-flaps disposed between pairs of continuous trailing edge structures.

17. The device of claim 15, wherein the actuated structures include a flexible continuous trailing edge supported internally by a plurality of actuated mini-flap ribs.

18. The device of claim 1, wherein:
   the first and second lengths different; and
   the first and second airfoils are located at opposition positions about the rotor hub.

19. The device of claim 1, wherein the first and second airfoils include distal tip regions defining an asymmetric profile with respect to each other.

20. A noise-reducing rotor operating method comprising:
   rotating a first airfoil and a second airfoil operatively connected to a rotor hub, wherein:
      the first airfoil defines a first aerodynamic profile and having a first length relative to the rotor hub, the first airfoil comprising a first anti-phase structure, the first anti-phase structure including upward and downward deflecting portions; and
      the second airfoil defines a second aerodynamic profile and having a second length relative to the rotor hub, the second airfoil comprising a second anti-phase structure, the second anti-phase structure including upward and downward deflection portions, the second anti-phase structure different from the first anti-phase structure,
      wherein at least one portion of the upward deflecting portions of the first airfoil is aligned to span a same radius as at least one portion of the downward deflecting portions of the second airfoil.

* * * * *